United States Patent
Pausch et al.

[11] Patent Number: 5,714,087
[45] Date of Patent: Feb. 3, 1998

[54] SUPERTWIST LIQUID-CRYSTAL DISPLAY

[75] Inventors: Axel Pausch, Seeheim-Jugenheim; Akihiro Kojima, Atsugi; Matthias Bremer, Darmstadt; Hideo Ichinose, Odawara; Michael Junge, Pfungstadt; Hiroshi Numata, Yokohama; Volker Reiffenrath, Rossdorf; Bernhard Rieger, Münster; Atsusi Sawada, Atsugi; Kazuaki Tarumi, Seeheim; Georg Weber, Erzhausen, all of Germany

[73] Assignee: Merck Patent Gesellschaft Mit Beschrankter Haftung, Darmstadt, Germany

[21] Appl. No.: 591,659

[22] PCT Filed: Jul. 28, 1994

[86] PCT No.: PCT/EP94/02494

§ 371 Date: Feb. 12, 1996

§ 102(e) Date: Feb. 12, 1996

[87] PCT Pub. No.: WO94/04789

PCT Pub. Date: Feb. 16, 1995

[30] Foreign Application Priority Data

Aug. 11, 1993 [EP] European Pat. Off. ............ 93112879
Aug. 31, 1993 [EP] European Pat. Off. ............ 93113898
Nov. 12, 1993 [EP] European Pat. Off. ............ 93118378
Mar. 3, 1994 [EP] European Pat. Off. ............ 94103199

[51] Int. Cl.[6] .................. C09K 19/52; C09K 19/30; C09K 19/12; C09K 19/20
[52] U.S. Cl. ............... 252/299.01; 252/299.63; 252/299.66; 252/299.67; 252/299.6
[58] Field of Search ............... 252/299.01, 299.63, 252/299.66, 299.67, 299.6

[56] References Cited

U.S. PATENT DOCUMENTS 5,374,374 12/1994 Weber et al. ............ 252/299.63
5,387,369 2/1995 Weber et al. ............ 252/299.01
5,516,454 5/1996 Scheuble et al. ............ 252/299.01
5,534,187 7/1996 Miyazawa et al. ............ 252/299.01
5,560,865 10/1996 Nakagawa et al. ............ 252/299.01

FOREIGN PATENT DOCUMENTS 492222 7/1992 European Pat. Off. .

OTHER PUBLICATIONS

Fearon et al., The Effect of Lateral Substitution, Molecular Crystal, Liquid Crystal, vol. 124, 89–103, 1985.

*Primary Examiner*—C. H. Kelly
*Attorney, Agent, or Firm*—Millen, White, Zelano, & Branigan, P.C.

[57] ABSTRACT

The invention relates to improved STN displays of which the nematic liquid crystalline medium comprises compounds of formulae I1, I2, II1 and/or III1

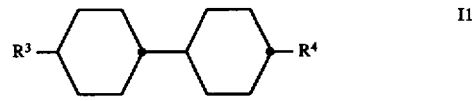

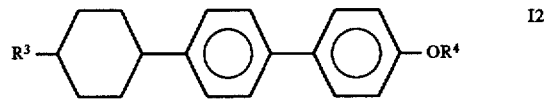

wherein $R^3$ and $R^4$ are each independently alkyl with 1 to 8 C atoms,

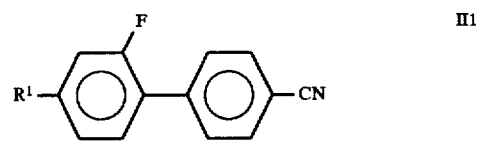

wherein $R^1$ is alkyl or alkoxy with 1 to 8 C atoms,

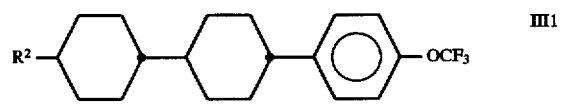

wherein R2 is oxaalkyl, alkenyl with up to 8 C atoms.

15 Claims, No Drawings

SUPERTWIST LIQUID-CRYSTAL DISPLAY

The invention relates to supertwist liquid-crystal displays (STN displays) having extremely short switching times and good steepnesses and angle dependencies, and to the novel nematic liquid-crystal mixtures used therein.

STN displays as in the heading are known, for example from EP 0,131,216 B1; DE 3,423,993 A1; EP 0,098,070 A2; M. Schadt and F. Leenhouts, 17th Freiburg conference on liquid crystals (8-10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784–L1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters, Vol. 4 (1), pp. 1–8 (1986). The term SFA here includes any relatively highly twisted display element having a twist angle with a value between 160° and 720°, such as, for example, the display elements of Waters et al. (C. M. Waters et al., Proc. Soc. Inf. Disp. (New York) (1985) (3rd Intern. Display Conference, Kobe, Japan), the STN-LCDs (DE OS 3,503,259), SBE-LCDs (T. J. Scheffer and J. Nehring, Appl. Phys. Lett. 45 (1984) 1021 ), OMI-LCDs (M. Schadt and F. Leenhouts, Appl. Phys. Lett. 50 (1987), 236, DST-LCDs (EP OS 0,246,842) or BW-STN-LCDs (K. Kawasaki et al., SID 87 Digest 391 (20.6)).

Compared with standard TN displays, STN displays of this type are distinguished by significantly better steepnesses of the electrooptical characteristic and, associated therewith, better contrast values, and by a significantly lower angle dependence of the contrast. Of particular interest are STN displays with extremely short switching times, in particular also at relatively low temperatures. In order to achieve short switching times, the viscosities, in particular of the liquid crystal mixtures have hitherto been optimized using usually optimized combinations of liquid crystal components and optionally also monotropic additives of relatively high vapour pressure. However, the switching times achieved were not adequate for all applications.

Shorter switching times can also be achieved by reducing the thickness of LC layer of the STN display and using liquid-crystal mixtures with a higher birefringence Δn.

All these approaches to shorter switching times, however, still end up with mixtures which were not adequate for every use.

The European patent EP 0 366 985 describes STN displays with comparable short switching times with 180° twist based on 4-alkyl-4'-alkoxybicyclohexyles. There is still a demand to improve these switching times.

Further demands for STN display are a higher multiplexability, lower threshold voltages and a steep characteristic curve.

Optimal parameters, however, cannot be achieved simultaneously for all the properties mentioned above because of opposite influence of different material parameters such as dielectric and elastic properties.

Therefore, there continues to be a great demand for improved STN displays having short switching times and, at the same time, a broad service temperature range, high characteristic line steepness, good angle dependency of the contrast and low threshold voltage.

The invention has the object of providing STN displays which only have the abovementioned disadvantages to a small extent, or not at all, and at the same time have very useful overall properties.

It has now been found that this object can be achieved if nematic liquid-crystal mixtures are used which contain one or more compounds selected from the formulae I1, I2, II1 and II2

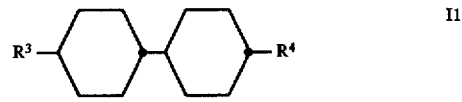

wherein $R^3$ and $R^4$ are each independently alkyl with 1 to 8 C atoms,

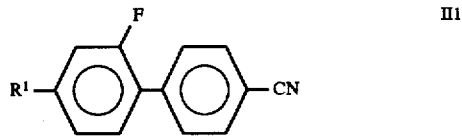

wherein $R^1$ is alkyl or alkoxy with 1 to 8 C atoms,

wherein $R^2$ is oxaalkyl, alkenyl with up to 8 C atoms.

The nematic liquid-crystal mixture preferably has a nematic phase range of at least 60° C., a viscosity of not more than 35 mPa.s and a dielectric anisotropy of at least +1, the dielectric anisotropies of the compounds and the parameters related to the nematic liquid-crystal mixture being based on a temperature of 20° C.

The invention thus relates to a STN display having
two plane-parallel outer plates which, together with a frame, form a cell,
a nematic liquid-crystal mixture of positive dielectric anisotropy which is present in the cell,
electrode layers with superposed alignment layers on the insides of the outer plates,
a pre-tilt angle between the longitudinal axis of the molecules at the surface of the outer plates and the outer plates of from about 1 degree to 30 degrees, and
a twist angle of the liquid-crystal mixture in the cell from alignment layer to alignment layer with a value of between 100° and 600°, wherein the nematic liquid-crystal mixture
a) comprises 20–90% by weight of a liquid-crystalline component A, comprising one or more compounds having a dielectric anisotropy of more than +1.5;
b) comprises 10–65% by weight of a liquid-crystalline component B, comprising one or more components having a dielectric anisotropy from −1.5 to +1.5;
c) comprises 0–20% by weight of a liquid-crystalline component C, comprising one or more compounds having a dielectric anisotropy of below −1.5, and
d) comprises an optically active component D in such an amount that the ratio between the layer thickness (separation of the plane-parallel outer plates) and the natural pitch of the chiral nematic liquid-crystal mixture is from about 0.2 to 1.3 and the nematic liquid-crystal mixture has a nematic phase range of at least 60° C., a viscosity of not more than 35 mPa.s and a dielectric anisotropy of at least +1, the dielectric anisotropies of the compounds and the parameters based on the nematic liquid-crystal mixture being based on a temperature of 20° C., characterized in that component B comprises at least one compound of formulae I1 and/or I2:

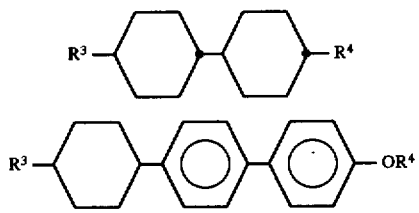

wherein $R^3$ and $R^4$ are each independently alkyl with 1 to 8 C atoms, and/or the component A comprises at least one compound of formulae III1 and/or III1

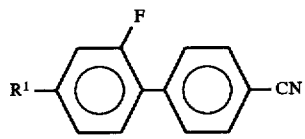

wherein $R^1$ is alkyl or alkoxy with 1 to 8 C atoms,

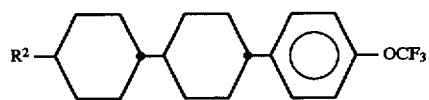

wherein $R^2$ is oxaalkyl, alkenyl with up to 8 C atoms.

Preferably component B comprises at least one compound of formula I1 and/or I2 and component A contains compounds of the formulae II and III.

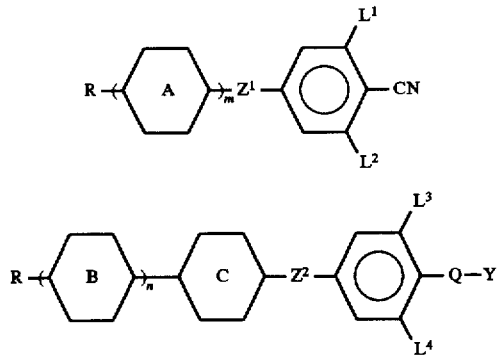

wherein

R is alkyl, alkoxy, oxaalkyl, alkenyl or alkenyloxy with up to 12 C atoms,

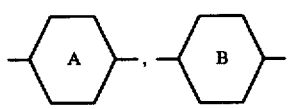

and

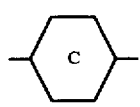

are each independently

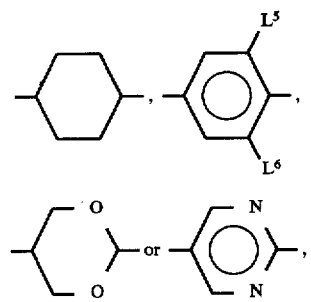

$L^1$ through $L^6$ are each independently H or F, $Z^1$ is -COO-, -CH$_2$CH$_2$- or a single bond,
$Z^2$ is -COO-, -CH$_2$CH$_2$-, -C≡C- or a single bond,
Q is CF$_2$, OCF$_2$, CFH, OCFH or a single bond,
Y is F or Cl,
m is 1 or 2, and
n is 0 or 1, in particular selected from the formulae IIa to IId and/or IIa to IIIh:

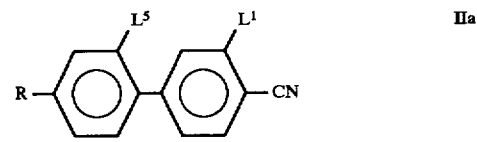

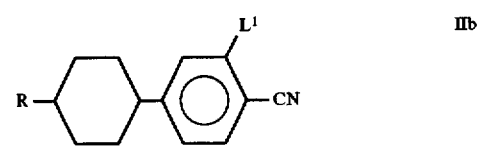

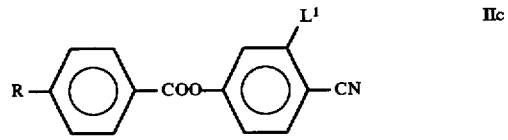

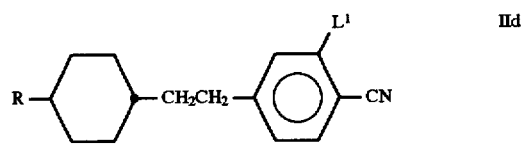

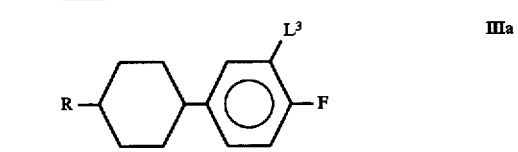

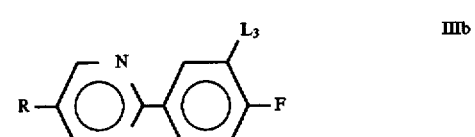

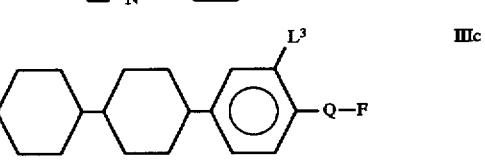

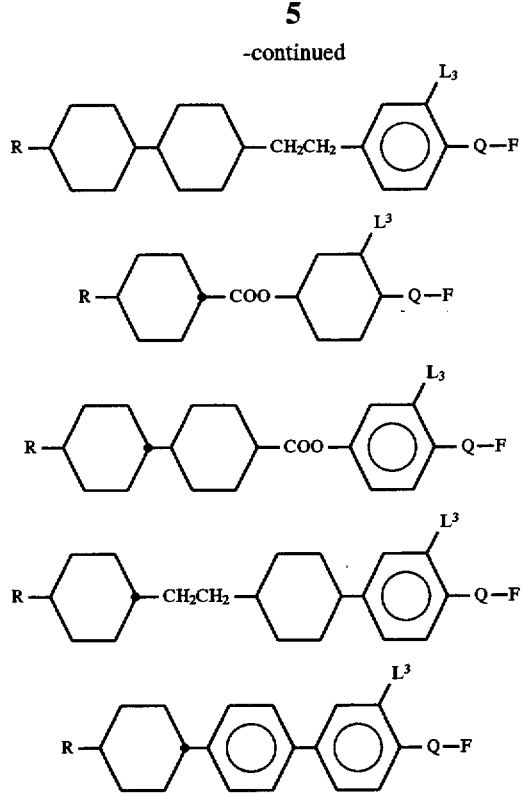

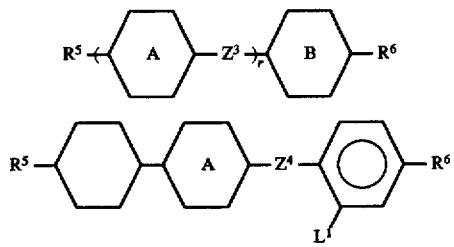

wherein R, $L^1$, $L^3$ and Q have the meaning given.

Preferably that component B contains one or more compounds selected from the group comprising IV to V:

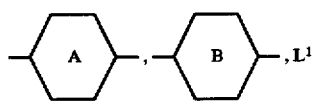

in which $R^5$ and $R^6$ have the meaning given for R and

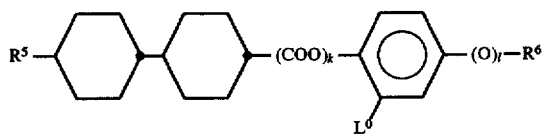

have the meaning given for formulae II or III, and $Z^3$ is -COO-, -CH$_2$CH$_2$-, -CH=CH- or a single bond, $Z^4$ is -COO- or a single bond.

In a particularly preferred embodiment component B contains at least one compound of formula I1 and at least one compound of formula V1:

wherein $R^5$ and $R^6$ are each independently alkyl with 1 to 8 C atoms,
L° is H or F, and
k and l are each independently 0 or 1, in particular in which
L° is F,
k is 1, and
n is 0, and/or at least one compound of formula V1, in which
L° is H,
k is 0, and
n is 0 or 1.

Preferably component B contains one or more compounds of formula II a:

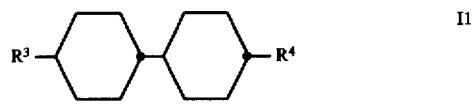

wherein o and p each are integers between 0 and 7 and the sum of o+p is an integer between 1 and 7.

The invention also relates to the corresponding liquid-crystal mixtures.

Another aspect of the invention is the use of compounds of formulae I1, I2, II1 and/III1,

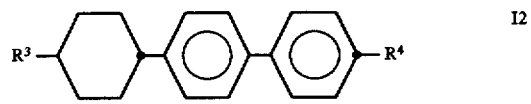

wherein $R^1$, $R^2$, $R^3$ and $R^4$ have the meaning given for the improvement of the switching times and/or the electro-optic steepness of STN-displays, and The compounds of formulae I1, I2, II1 and III1 are partly known and partly novel. The invention therefore relates to these novel compounds, which are the following:

a) Compounds of formula I2a, wherein the sum of q+v is 0 or 1;

b) 2'-Fluoro-4-cyano biphenyl of formula II1 a

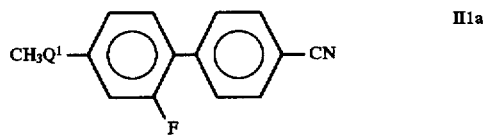

wherein
$Q^1$ is O, CH$_2$ or a single bond.

Another aspect of the invention is the use of a composition of at least two compounds of formulae I1 and I2

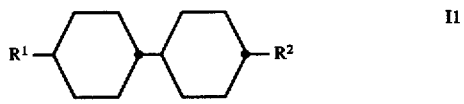

-continued

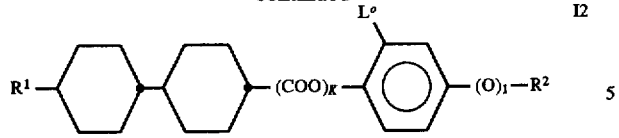

wherein $R^1$, $R^2$, $L^o$, $K$, and $I$ have the meaning given for the improvement of the switching times of STN-displays.

The invention relates furthermore to an improved process for the preparation of 2'-fluoro-4-cyano biphenyls of formula I, the improvement wherein a 2-fluorophenylboronic acid of formula A,

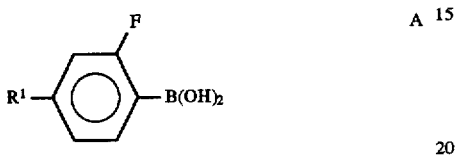

wherein $R^1$ has the meaning given is reacted with a p-halogen benzonitrile of formula B,

wherein

Hal is Cl or Br, in the presence of catalytic amounts of a transition metal which is bonded to a phosphine ligand.

The individual compounds of the formulae I1, I2, II, III1, III and III1 and also other compounds which can be used in the STN displays according to the invention, are either known or can be prepared analogously to the known compounds.

The compounds of formula I1 are known from Japanese laid open application JP 60-1857-A; the compounds of formula I1 are partly known from DE 29 277 277; the compounds of formula II1 are partly known from J. E. Fearon et. al Mol. Cryst. Liq. Cryst. 1985, Vol. 124 pp. 89–103; compounds of formula III1 are known from DE 37 32 284, and the compounds of formula V1 are known from German laid open application DE 2933563 and DE 3211306, but there is no hint in these publications that the steepness and the switching times of SFA's can be improved with the aid of these compounds.

The mixtures of this invention allow the realization of STN displays with high multiplex ratios, broad working temperature range, low threshold voltages (below 3 volt, preferably between 1.25 and 2.80, in particular between 1.60 and 2.20 volt) and steep characteristic curves.

The compounds of the formulae I1, I2, II1 and III1 impart to improved STN compositions, in particular with higher clearing points; the compounds of formula I1 and II2 have low values of the rotational viscosity and lead therefore to short switching times; the compounds of formulae I2 and III1 have high values of the ratio of the elastic constants ($K_3/K_1$) and lead therefore to high steepnesses.

The mixtures according to the present invention have an optic anisotropy ($\Delta n$) of more than 0.120, preferably 0.130–0.170, in particular 0.130–0.160.

The mixtures according to the invention preferably contain one or more compounds of formula III with three rings selected from the following group:

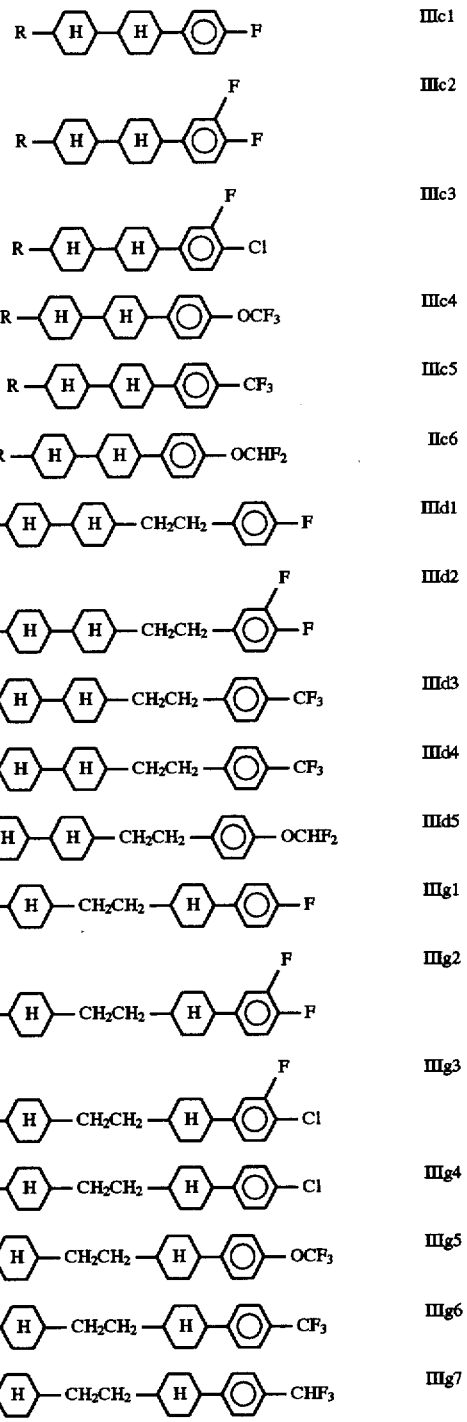

Preferred mixtures contain two, three or more compounds of the formulae I1, I2, II1, III1, IIa, IIb, IIc, IId, IIIb and IIIc, in particular one or more compounds of the formula IIIb and two to four compounds of formulae I1/I2 and one to three compounds selected from the formulae IIb and IIc.

Preferred liquid-crystal mixtures which can be used according to the invention contain one or more compounds from group A preferably in a proportion of 20% to 90%, preferably 35% to 80%. These compounds or this compound from group A have a dielectric anisotropy of more than +8 (preferably of more than +12) and form the component A of the LC mixtures of this invention.

Preferably group A comprises additional compounds selected from the following group:

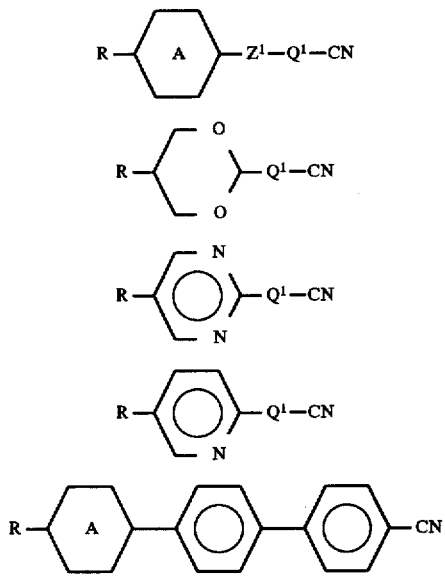

AI

AII

AIII

AIV

AV wherein

R has the meaning given,

Q¹ is the formula

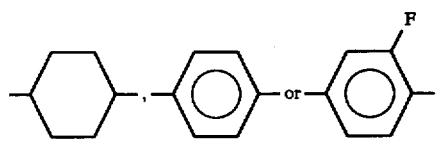

Z₁ is

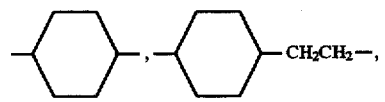

a single bond, -CH₂CH₂, -CO-O- or -O-CO- and

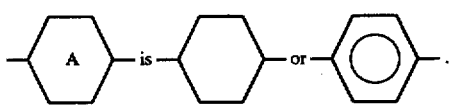

Preferably the mixtures comprise one or more compounds of the formula Al in the range of 5 to 50%. Preferred are those compounds wherein $Z^1$ denotes a single bond, -CH₂CH₂- or -CO-O- and especially preferred are the following compounds:

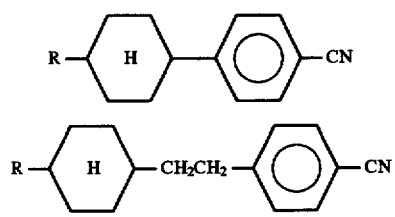

IIb1

IId1

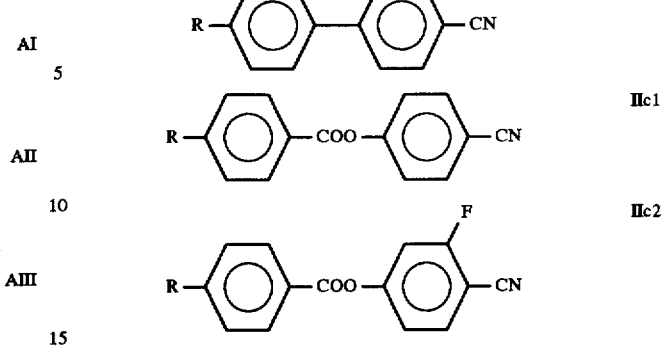

IIa1

IIc1

IIc2

Also preferred are the following compounds:

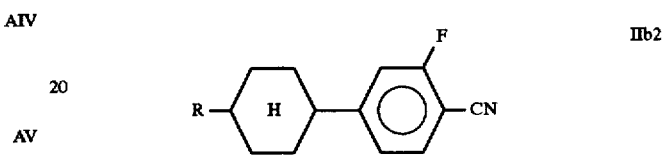

IIb2

Group A preferably comprises one or more compounds selected from the formulae II1, III1, IIb1 to IIc1 and optionally also one or more compounds of the formula IIc2.

Preferably the mixtures further contain one or more polar compounds with a higher clearing point, e.g. selected from the following compounds:

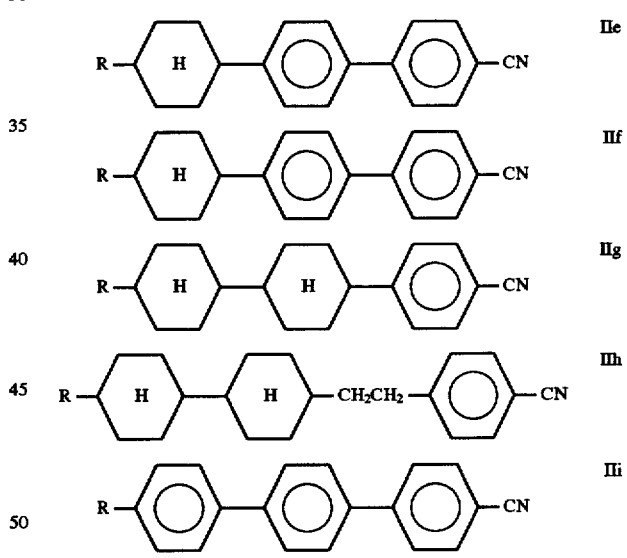

IIe

IIf

IIg

IIh

IIi

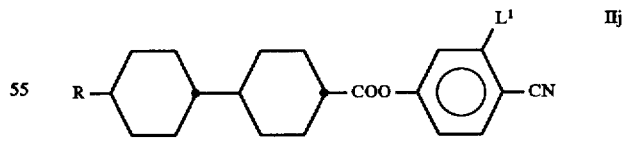

IIj

In the above four formulae the 1,4-phenylene rings can also be laterally substituted by one fluorine atom, e.g.

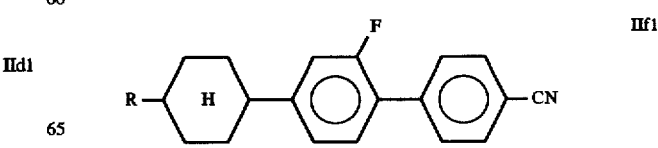

IIf1

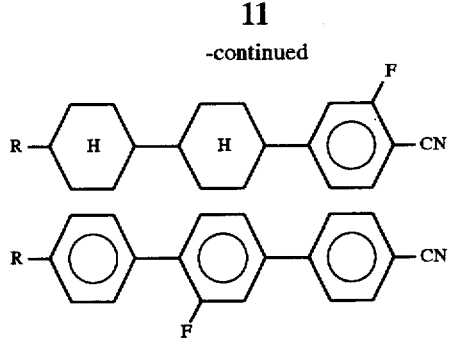

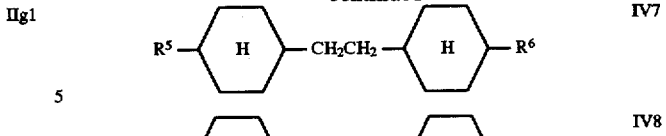

These polar compounds with a higher clearing point are preferably used in the range of 2 to 25%.

In another preferred embodiment the mixtures comprise one or more compounds with a very high dielectric anisotropy. Such compounds are preferably used in the range of 2 to 50%. Preferred compounds of this type are those of the formulaeI, IIc2 and IIj1.

Preferred liquid-crystal mixtures contain two or more compounds from group B, preferably in a proportion of 10% to 40%. These compounds or this compound from group B have either low values of the rotational viscosity ($\gamma_1$)<150 mPa.s or a clearing point of more than 120° and are dielectrically neutral (($\Delta\epsilon$)<2) or medium polar ($\Delta\epsilon$ in the range of +2 to +10, preferably +4 to +8) and form component B of the LC mixtures of this invention.

Preferably component B contains in addition to the compounds of formulae I1 and I2 preferably one or more compounds selected from the group comprising IV1 to IV8 with two rings:

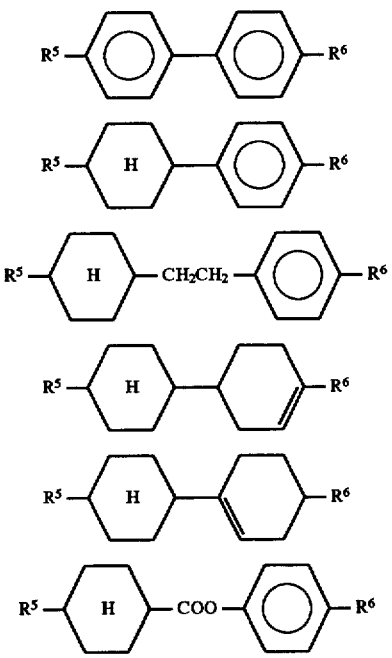

in which $R^5$ and $R^6$ have the meaning given for R and/or one or more compounds selected from the group comprising IV9 to IV25 with three rings:

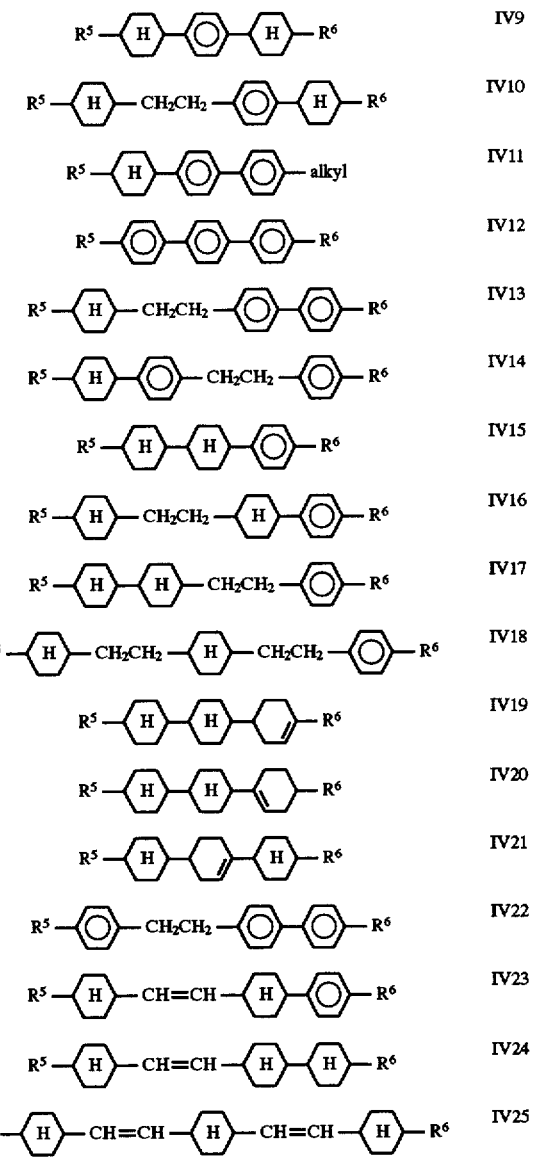

in which $R^5$ and $R^6$ have the meaning given, the 1,4-phenylene groups in IV9 to IV18 and IV22 and IV23 may each, independently of one another, also be mono- or polysubstituted by fluorine, and/or one or more compounds selected from the group comprising IV26 to IV31:

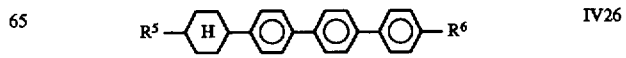

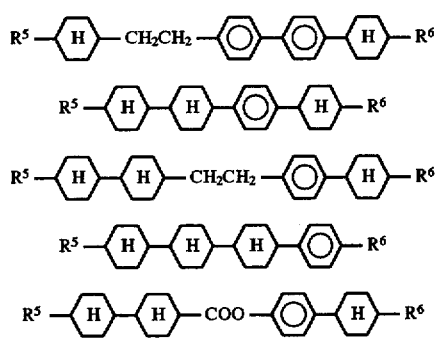

in which $R^5$ and $R^6$ have the meaning given, and the 1,4-phenylene groups in IV26 to IV31 may each, independently of one another, also be mono- or polysubstituted by fluorine.

The LC mixtures also comprise an optically active component D, in an amount such that the ratio between the layer thickness (separation of the plane-parallel carrier plates) and the natural pitch of the chiral nematic liquid crystal mixture is more than 0.2 suitable to the desired twist angle.

Suitable dopants can be selected from a wide variety of known chiral materials and commercially available dopants such as cholesteryl nonanoate, S 811 (E. Merck, Darmstadt, FRG) and CB 15 (BDH, Poole, UK). The choice thereof is not crucial per se.

Preferably the mixtures also contain one or more compounds from group B1 comprising the compounds of the formulae B1I to B1 IV:

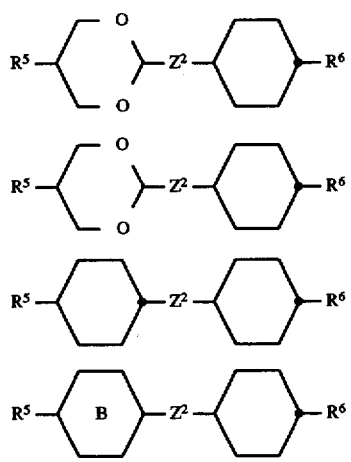

in which $R^5$ and $R^6$, in each case independently of one another, are as defined for R, $Z^2$ is -CH$_2$CH$_2$-, -CO-O-, -O-CO- or a single bond, and B is

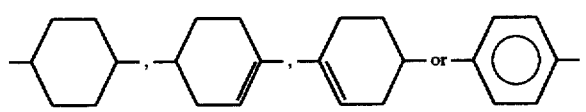

and/or at least one component selected from group B2 comprising the compounds of the formulae B1V to B1VII:

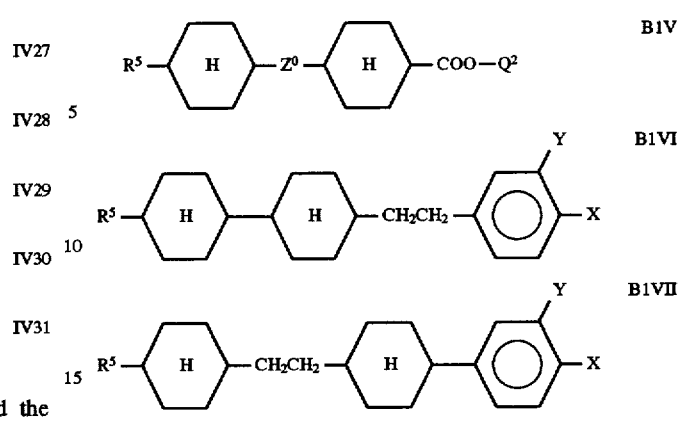

in which $R^5$ is as defined for R, $Z^0$ is -CH$_2$CH$_2$- or a single bond, and $Q^2$ is

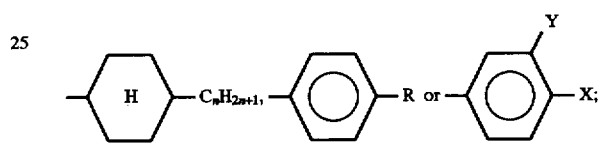

where n is 1 to 9, X is CN or F and Y is H or F; and/or at least one component selected from group B3 comprising the compounds of the formulae BVIII, BIX and BX:

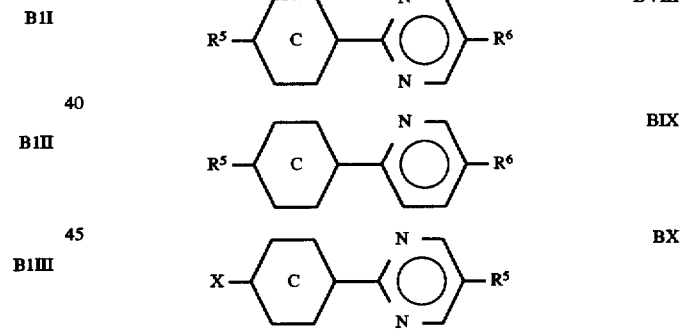

in which $R^5$ and $R^6$, in each case independently of one another, are as defined for R, X is Cl or F, and

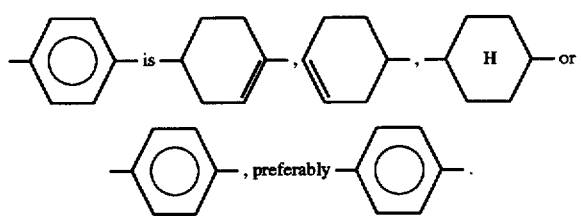

In a further preferred embodiment the LC mixtures contain one or more compounds selected from group T, comprising compounds of the formulae T1 and T2:

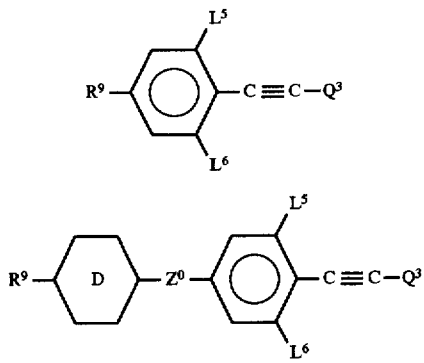

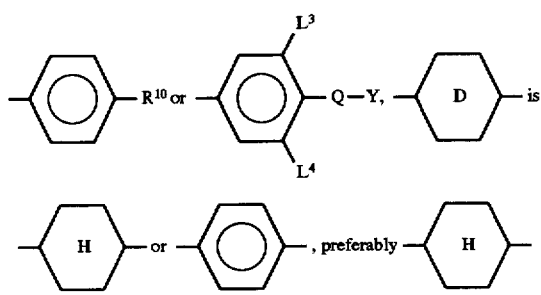

in which $Q^3$ is

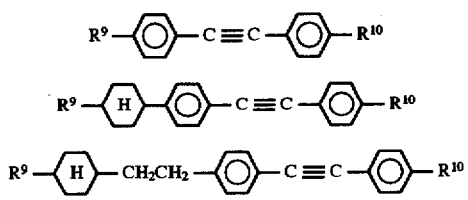

$L^3$ to $L^6$, Q and Y are as defined for the compounds of the formula III.

$R^9$ and $R^{10}$, in each case independently of one another, are each R,

X is F, Cl or $OCF_3$, and $Z^0$ is -COO-, -$CH_2CH_2$- or a single bond.

The proportion of component(s) from group T is preferably 5% to 30%, in particular 5% to 20%.

Preferably component B contains one or more compounds selected from the group comprising X to XII:

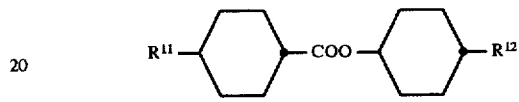    X

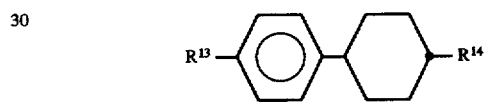    XI

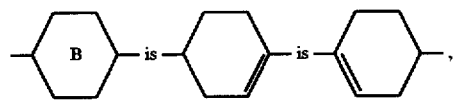    XII in which $R^9$ and $R^{10}$ have the meaning given, in particular wherein $R^2$ is alkyl with 1 to 4, most preferred 1 or 2 C-atoms and $R^3$ is alkoxy with 1 to 4, most preferred 1 or 2 C-atoms.

The proportion of component(s) from group B1 is preferably 10% to 50%, in particular preferably about 15% to 40%. Components of the formulae B1III and B1IV are preferred. Particularly preferred compounds of the formula B1III are those of the following sub-formulae:

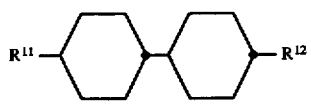

T1

T2 in which
$R^{11}$ is $CH_3$-$(CH_2)_n$-O-, trans-H-$(CH_2)_r$-CH=CH-$(CH_2CH_2)_s$-$CH_2$O- or trans-H-$(CH_2)_r$-CH=CH-$(CH_2CH_2)_s$-, $R^{12}$ is $CH_3$-$(CH_2)_t$-, in particular in which $R^2$ is $CH_3$-$(CH_2)_n$-O- with n being an integer between 0 and 4 and t being an integer between 0 and 4, n is 0 to 8 t is 0 to 8.

Furthermore preferred compounds are those of the sub-formula in which $R^{11}$ and $R^{12}$ are as defined above.

The proportion of the compounds of the formula B1III of the above mentioned sub-formulae is preferably about 5% to 45%, in particular preferably about 10% to 35%. Particularly preferred compounds of the formula B1IV are those of the following sub-formula:

in which
$R^{13}$ is $CH_3$-$(CH_2)_n$-O- or trans-H-$(CH_2)_r$-CH=CH-$(CH_2CH_2)_s$-$CH_2$O- and $R^{14}$ is $CH_3$-$(CH_2)_t$, where
n is 1,2, 3 or 4,
r is 0, 1,2 or 3,
s is 0 or 1, and
t is 1,2, 3 or 4.

The proportion of these compounds or of the compounds of the formula B1IV is preferably about 5% to 40%, in particular preferably about 10% to 35%.

In a particularly preferred embodiment, the mixtures simultaneously contain compounds of the formulae B1III and B1IV, the total proportion for components of group B1 being observed.

If compounds of the formulae B1I and B1III are present, $R^5$ and $R^6$ are preferably, in each case independently of one another, n-alkyl having 1 to 7 C atoms or (trans)-n-alkenyl having 3 to 7 C atoms. $Z^2$ is preferably a single bond. BI is particularly preferred.

Furthermore preferred mixtures according to the invention are those which contain one or more compounds of the formula B1IV in which and $R^5$ and $R^6$ have one of the above mentioned preferred meanings, in particular preferably n-alkyl having 1 to 7 C atoms.

In all cases, the total proportion for components of group B1 is observed.

The proportion of the compounds of group B2 is preferably about 10% to 45%, in particular preferably 10% to 20%. The proportion (preferred ranges) for B1V to B1VII is as follows:

B1V about 10% to 30%, preferably about 10% to 15%

Total of B1VI and B1VII: about 10% to 25%, preferably about 10% to 20%.

Preferred compounds of group B2 are indicated below:

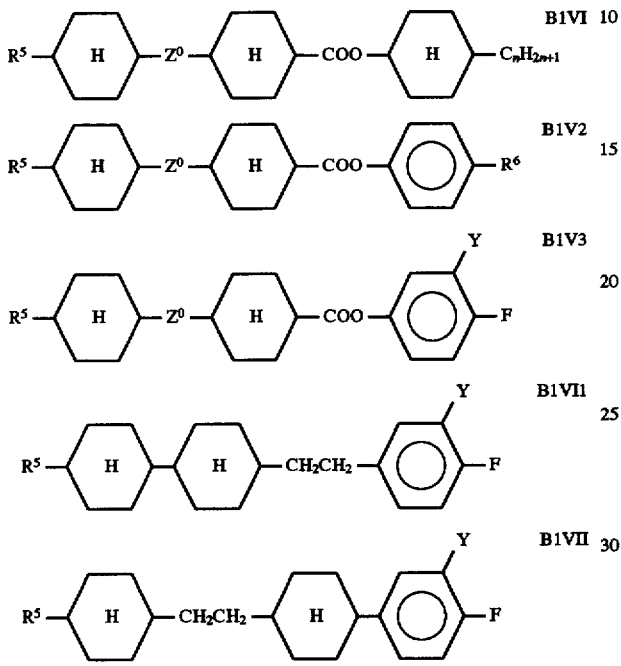

$R^5$ is preferably n-alkyl having 1 to 7 C atoms or (trans)-n-alkenyl having 3 to 7 C atoms. $Z^0$ is preferably a single bond. $R^6$ preferably has the preferred meaning mentioned above for R or is fluorine. Y is preferably fluorine.

The mixtures according to the invention preferably contain one or more compounds selected from the group comprising B1V3, B1VI1 and B1VII1 in a total proportion of about 10 to 35%.

In a particularly preferred embodiment, the mixtures according to the invention contain, besides B1V3, B1VI1, B1VII1 and B1V2 (R=F), further terminally fluorinated compounds, for example selected from the group comprising:

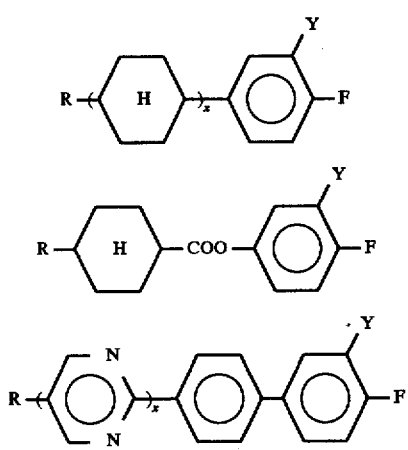

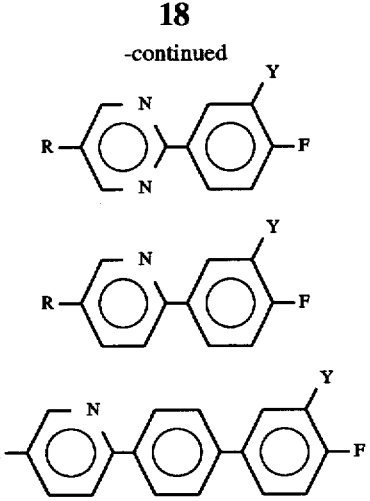

in which R is preferably n-alkyl having 1 to 7 C atoms or (trans)-n-alkenyl having 3 to 7 C atoms, X is 1 or 2, y is 0 or 1 and Y is H or F.

The total proportion of all terminally fluorinated compounds is preferably about 5% to 65%, in particular about 15% to 40%.

The proportion of the compounds from group B3 is preferably about 10% to 30%, in particular preferably about 10% to 20%. $R^2$ is preferably n-alkyl or n-alkoxy, each having 1 to 9 C atoms. However, it is also possible to employ analogous compounds containing alkenyl or alkenyloxy groups. Compounds of the formula BVIII are preferred.

The mixtures according to the invention contain preferably compounds of the formulae I1 and/or I2 and compounds from at least one of groups B1, B2 and B3. They preferably contain one or more compounds from B1 and one or more compounds from group B2 and/or B3.

Mixtures according to the invention containing at least one compound of formula I1 and at least two compounds of formula I2 are particularly preferred.

The proportion of compounds of formulae I1 and I2 is preferably about 10% to 45%, in particular 15% to 40%.

The proportion of compounds of formula I1 is preferably 5% to 20%, in particular 8% to 18%. The proportion of the compounds of formula I2 is preferably 2% to 30%, in particular 5 to 25%.

The proportion of compounds of component C is preferably about 0% to 20%, in particular about 0% to 10%. Those skilled in the art can easily adjust this proportion to produce the threshold voltage desired, it being possible to use, in principle, all customary liquid-crystal compounds where $\Delta\epsilon < -1.5$.

In a particularly preferred embodiment, the mixtures according to the invention preferably contain about 5% to 20% of one or more compounds having a dielectric anisotropy of less than −2 (component C). Compounds of this type are known, for example derivatives of 2,3-dicyanohydroquinone or cyclohexane derivatives containing the structural element

as DE-OS 3,231,707 or DE-OS 3,407,013.

However, compounds containing the structural element 2,3-difluoro-1,4-phenylene are preferably chosen, for example compounds as in DE-OS 3,807,801, 3,807,861, 3,807,863, 3,807,864 or 3,807,908. Particularly preferred are tolans containing these structural elements, as in International Patent Application PCT/DE 88/00133, in particular those of the formulae

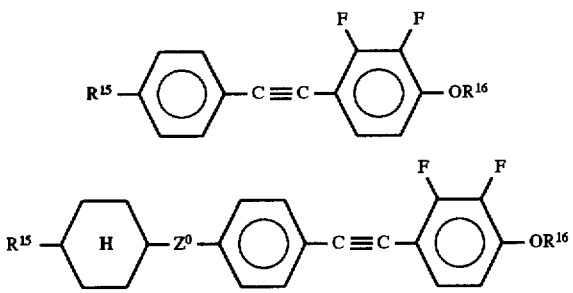

in which $R^{15}$ and $R^{16}$, in each case independently of one another, are preferably n-alkyl having 1 to 7 C atoms or n-alkenyl having 3 to 7 C atoms, and $Z^0$ is -CH$_2$CH$_2$- or a single bond.

Particularly preferred are also the phenylcyclohexylcarboxylates of the formulae

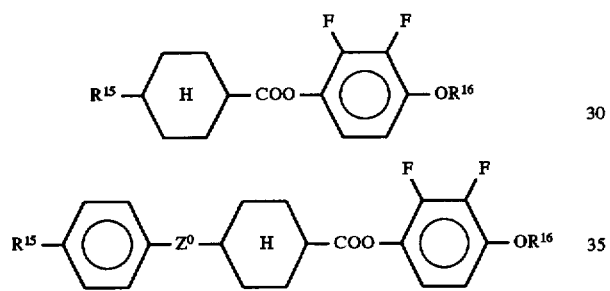

Display according to at least one of claims 1 to 6, characterized in that component C contains one or more compounds selected from the group comprising V to IX:

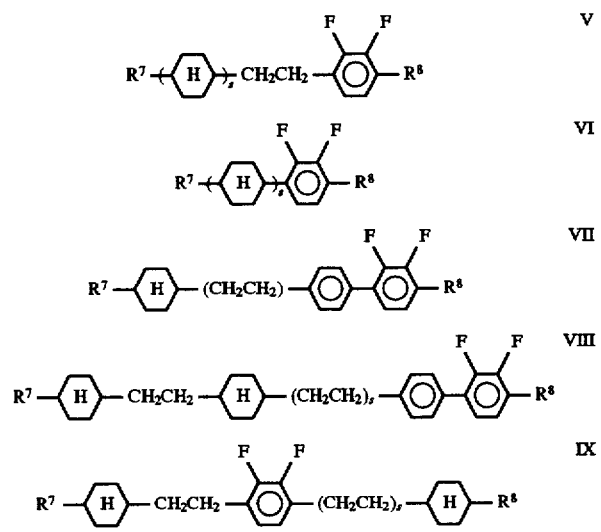

in which $R^2$ and $R^3$ have the meaning given and s is 0 or 1.

Preferably component B contains one or more compounds selected from the group comprising Xa to XIIa:

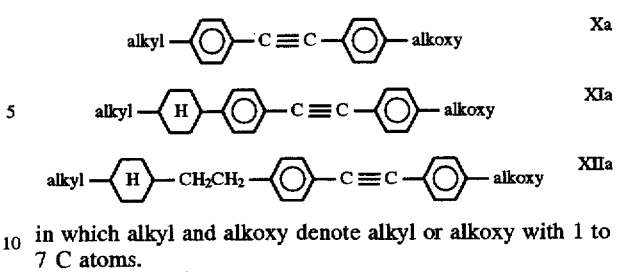

in which alkyl and alkoxy denote alkyl or alkoxy with 1 to 7 C atoms.

Component C causes, in particular, an improvement in the steepness of the characteristic line.

In a particularly preferred embodiment, the mixtures contain about 5% to 35%, in particular preferably about 10% to 20%, of liquid-crystalline tolan compounds. These make it possible to work with smaller cell thicknesses (about 5–6 μm), which significantly shorten the switching times. Particularly preferred tolans are indicated below:

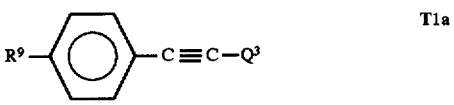

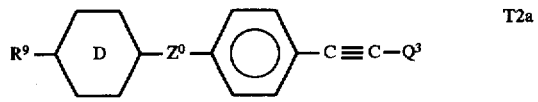

$R^9$ is preferably n-alkyl having 1 to 7 C atoms, $Z^0$ is -CH$_2$CH$_2$- or a single bond,

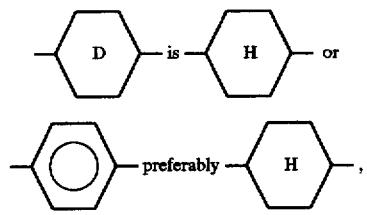

$Q^3$ is

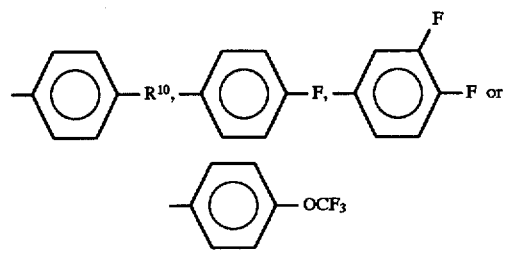

where
$R^{10}$ is n-alkyl or n-alkoxy, each having 1 to 7 C atoms, or n-alkenyl or n-alkenyloxy, each having 3 to 7 C atoms.

Preferably component A contains one or more compounds of the formula T3a

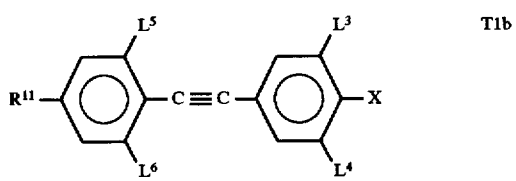

in which $R^{11}$ is -$C_nH_{2n+1}$, -$OC_nH_{2n+1}$,

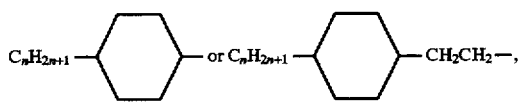

n is an integer for 1 to 15, $L^3$ to $L^6$ are each, independently of one another, H or F, and X is F, Cl or $OCF_3$.

In a preferred embodiment the nematic mixture contains 5–25% of one or more compounds of formula I1, 20–35% of two or more compounds selected from the formulae X, XI, XII and T1b, and 10–30% of two or more compounds of formula IIa.

These mixtures show very short switching times of less than 100 ms, a steepness of 1.07 to 1.15, a birefringence between 0.160 to 0.180 and a threshold voltage between 2.0 and 2.5 Volts.

These mixtures are in particular suitable for high-multiplexed STN-displays in which each pixel is addressed by orthogonal row wave forms (e.g. Active Addressing™, T. H. Scheffer et al.; Displays, Vol 14 (2) 1993, pp. 74–83).

In further particularly preferred embodiments, the mixtures contain a component C which contains one or more compounds having a 1-cyano-trans-1,4-cyclohexylene group or a 2,3-difluoro-1,4-phenylene group, at least two compounds of the formulae AIII or AV, compounds of the formulae AIII and AV, at least one compound from the following group:

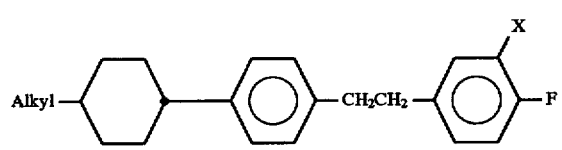

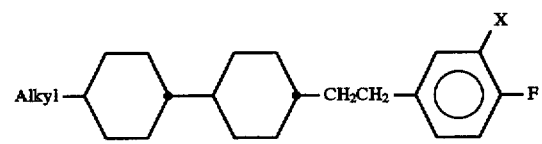

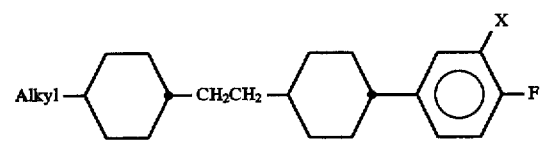

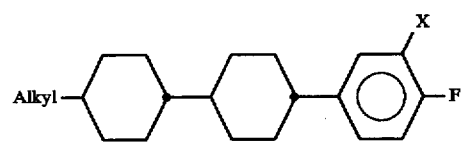

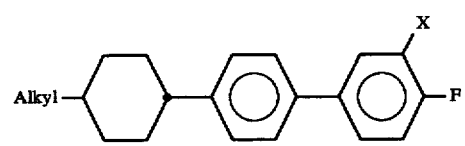

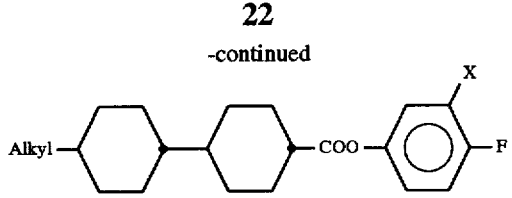

in which alkyl is a straight-chain alkyl group having 2–7 C atoms, and X is H or F, one or more compounds in which R is a trans-alkenyl group or a trans-alkenyloxy group, one or more compounds selected from the following group

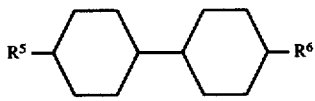

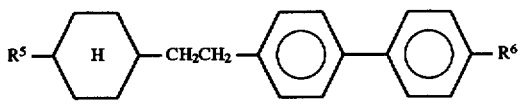

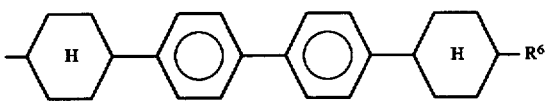

in which $R^5$ and $R^6$ have the preferred meanings indicated in the case of component B, and one of the two 1,4-phenylene groups may also be substituted by fluorine; the proportion of these compounds is 0% to 25%, preferably about 5% to 15%.

In a further particularly preferred embodiment the mixtures contain one or more, in particular 1, 2, 3 or 4, compounds selected from the formulae IIId, IIIb, IIIi and IIIp at least two compounds selected from the formulae IIb1, IIc1 or IIc2.

one or more compounds of the formula B1IV one or more compounds of the formulae T1 or T2 or one or more compounds selected from the following group

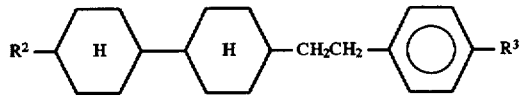

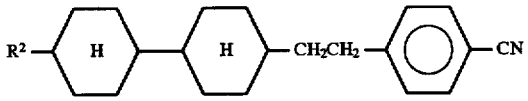

wherein $R^2$ and $R^3$ are defined as for the compounds of the formula III.

As a rule component B consists of 3 to 10, preferably 4 to 9 different compounds.

In a preferred embodiment component B essentially consists of:

at least one compound of formulae I1 and/or I2, and at least one compound selected from the formulae IV2, IV6, IV8, IV11, IV14, IV17, IV23, IV26, IV31, V1, B VIII, X and XI, in particular selected from the following formulae:

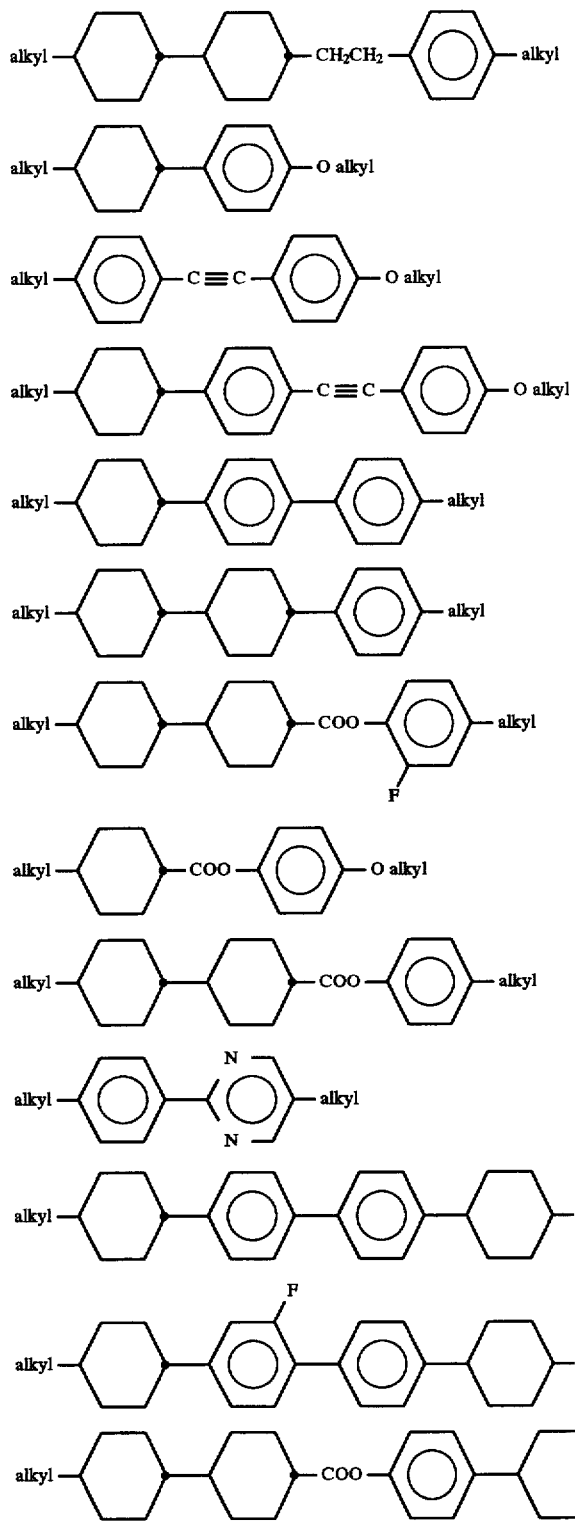

| | |
|---|---|
| alkyl—⬡—⬡—CH₂CH₂—◯—alkyl | ECCP-nm |
| alkyl—⬡—◯—O alkyl | PCH-nOm |
| alkyl—◯—C≡C—◯—O alkyl | PTP-nOm |
| alkyl—⬡—◯—C≡C—◯—O alkyl | CPTP-nOm |
| alkyl—⬡—◯—◯—alkyl | BCH-nm |
| alkyl—⬡—⬡—◯—alkyl | CCP-nm |
| alkyl—⬡—⬡—COO—◯(F)—alkyl | CP-nmF |
| alkyl—⬡—COO—◯—O alkyl | D-nOm |
| alkyl—⬡—⬡—COO—◯—alkyl | CP-nm |
| alkyl—◯—(pyrazine)—alkyl | PYP-nm |
| alkyl—⬡—◯—◯—⬡—alkyl | CBC-nm |
| alkyl—⬡—◯(F)—◯—⬡—alkyl | CBC-nmF |
| alkyl—⬡—⬡—COO—◯—⬡—alkyl | CCPC-nm |

Component B consists preferably of 3 to 10 compounds, in particular of 5–60%, in particular 15–55% of one, two or three compounds of formula I1, and/or 10–40%, in particular 15–30% of one, two or three compounds of formula I2, and 0–45%, in particular 5–30% of at least one ECCP-nm;
0–60%, in particular 10–50% of at least one PCH-nOm;
0–25%, in particular 1–20% of at least one PTP-nOm;

0–70%, in particular 15–60% of at least one CPTP-n0m;
0–20%, in particular 1–15% of at least one BCH-nm;
0–15%, in particular 5–10% of at least one CCP-nm;
0–40%, in particular 5–30% of at least one CP-nmF;
0–20%, in particular 1 to 15% of at least one compounds selected from D-n0m and CP-nm;
0–20%, in particular 3–17% of at least one, preferably one, two PYP-nm;
0–20%, in particular 5–16% of at least one, preferably one, two or three compounds selected from CBC-nm, CBC-nmF and CCPCnm.

As a rule component A consists of 2 to 9, preferably 4 to 7 compounds. In a preferred embodiment component A essentially consists of at least one compound selected from the formulae II1, III1, IIa, IIb, IIc, IIh, IIj, IIIb, IIIc, with Q being OCF$_2$, IIIdm with Q being a single bond, IIIh, with Q being a single bond, IIIf, with Q being OCF$_2$, and T1b, in particular selected from the following formulae:

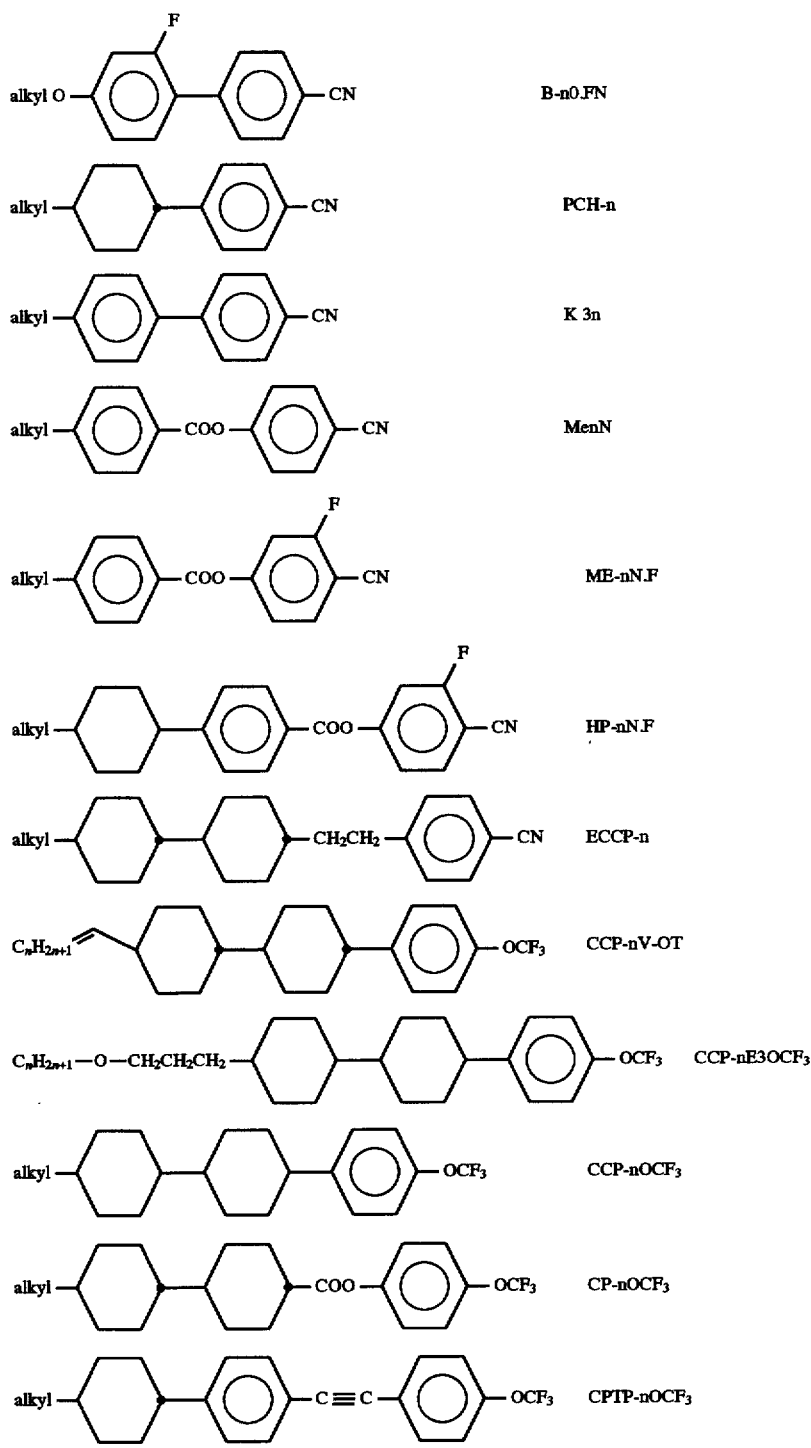

-continued

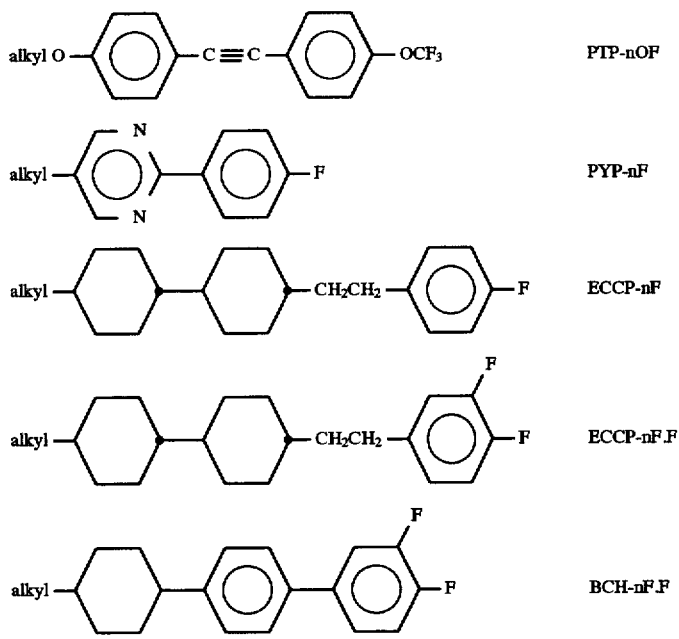

Component A consists preferably of
20–100%, in particular 25–80% of at least one compound selected from PCH-n and K3n;
0–40%, in particular 15–25% of at least one compound of formulae B-nO.FN;
10–60%, in particular 15–40% of at least one compound selected from CCP-nOCF$_3$ and CP-nOCF$_3$;
0–25%, in particular 5 to 25% of at least one compound selected from CCP-nV-OT and CCP-nE3OCF$_3$;
0–50%, in particular 5–30% of at least one compound selected from MenN, ME-nN.F and HP-nN-F;
0–30%, in particular 5–25% of at least one PTP-nOF;
0–50%, in particular 10–25% of at least one CPTP-nOCF$_3$;
0–30%, in particular 5–25% of at least one PYP-nF;
0–60%, in particular 10–25% of at least one compound selected from BCH-nF.F, ECCP-nF.F and ECCP-nF; and
0–20%, in particular 5–15% of at least one ECCP-n.

Preferably the component B contains at least one compound of formula I1 and at least one tolan derivative, in particular 2 to 0.5 parts of formula I1 related to 1 part of tolans.

In a preferred embodiment component B essentially consists of
5–60%, in particular 15–55% of at least one compound of formula I1;
0–20%, in particular 5–18% of at least one PTP-nOm;
1–70%, in particular 15–60% of at least one CPTP-nOm, and
0–60%, in particular 5–30% of at least one compound selected from the other neutral compounds, in particular from PCH-nOm, BCH-nOm and CP-nmF, The construction of the liquid-crystal display elements according to the invention from polarizers, electrode base plates and electrodes having a surface treatment such that the preferential orientation (director) of the liquid-crystal molecules in each case adjacent thereto is usually mutually twisted from one electrode to the other by a value of 160° to 720°, corresponds to the customary construction for display elements of this type. Displays having an twist angle between 220° and 270° are preferred. The term customary construction here is used in broad terms and also includes all derivatives and modifications of supertwist cells, in particular also matrix display elements. The surface tilt angle at the two support plates may be identical or different. Identical tilt angles are preferred.

An essential difference between the display elements according to the invention and the display elements customary hitherto based on the twisted nematic cell is, however, the choice of liquid-crystal components in the liquid-crystal layer.

The liquid-crystal mixtures which can be used according to the invention are prepared in a manner customary per se. In general, the desired amount of the components used in a relatively small amount is dissolved in the components making up the principal constituent, expediently at elevated temperature. It is also possible to mix solutions of the components in an organic solvent, for example in acetone, chloroform or methanol, and to remove the solvent again, after mixing, for example by distillation.

The dielectrics may also contain further additives known to those skilled in the art and described in the literature. For example, 0–15% of pleochroic dyes may be added.

Without further elaboration, it is believed that one skilled in the art can, using the preceding description, utilize the present invention to its fullest extent. The preferred specific embodiments are, therefore, to construed as merely illustrative, and not limitative of the disclosure in any way whatsoever.

The entire disclosures of all applications, patent, and publications cited above and below, and of the following corresponding European patent applications are hereby incorporated by reference:

| EP | 93 11 2879.7 | filed August 11, 1993; |
| EP | 93 11 3898.6 | filed August 31, 1993; |
| EP | 93 11 8378.4 | filed November 12, 1993 and |
| EP | 94 10 3199.9 | filed March 3, 1994. |

The examples below are intended to illustrate the invention, without representing a limitation.

The abbreviations have the following meanings:

| | |
|---|---|
| S-N | smectic-nematic phase transition temperature, |
| N-I | nematic-isotropic phase transition temperature, |
| c.p. | clear point, |
| visc. | viscosity (m Pa · s), |
| $T_{ave}$ | average switching time = $\dfrac{T_{on}+T_{off}}{2}$ |
| $T_{on}$ | time from switching on until 90% of the maximum contrast is reached, |
| $T_{off}$ | time from switching off until 10% of the maximum contrast is reached, |
| $V_{10}$ | threshold voltage (volt) |
| $V_{90}$ | saturation voltage |
| $V_{90}V_{10}$ | steepness |

The SFA is addressed in multiplex operation (multiplex ratio 1:2:40, bias 1:15).

Above and below, all temperatures are given in °C. Percentages are per cent by weight. The values for the switching times and viscosities relate to 20° C.

In the present patent application and in the following examples all chemical structures of LC compounds are given by acronyms the transformation of which into chemical formulae is done as shown in the following. All residues $C_nH_{2n+1}$ and $C_mH_{2m+1}$ are straight-chained alkyl groups with n resp. m carbon atoms. The code of Table B is self-explanatory. In Table A only the acronym for the core structure is given. In a concrete compound this acronym is followed by a dash and a code for the substituents $R^1, R^2, L^1$ and $L^2$ as follows:

| Code for $R^1$, $R^2, L^1, L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nOmFF | $C_nH_{2n+1}$ | $OC_mH_{2m+1}$ | F | F |
| nmF | $C_nH_{2n+1}$ | $C_mH_{2m+1}$ | F | F |
| nCF₃ | $C_nH_{2n+1}$ | CF₃ | H | H |
| nOCF₃ | $C_nH_{2n+1}$ | OCF₃ | H | H |
| nOCF₂ | $C_nH_{2n+1}$ | OCHF₂ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nNf | $C_nH_{2n+1}$ | CN | F | H |
| nAm | $C_nH_{2n+1}$ | $COOC_mH_{2m+1}$ | H | H |
| nF.Cl | $C_nH_{2n+1}$ | Cl | H | F |
| V-OT | $H_2C=CH—$ | OCF₃ | H | H |
| nV-OT | $C_nH_{2n+1}$—CH=CH— | OCF₃ | H | H |
| nE3OCF₃ | $C_nH_{2n+1}OC_3H_3$— | OCF₃ | H | H |

TABLE A

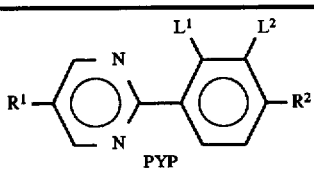
PYP

TABLE A-continued

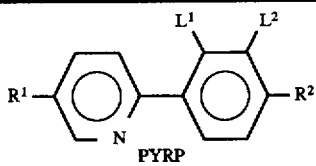
PYRP

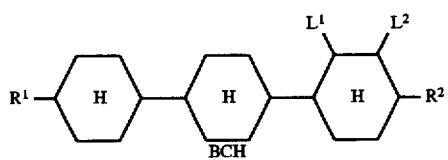
BCH

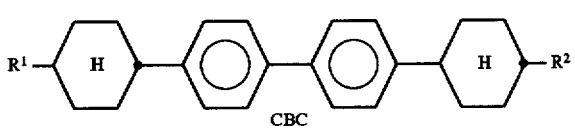
CBC

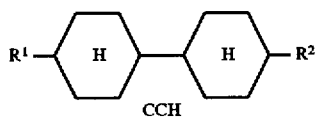
CCH

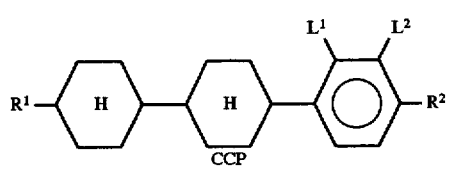
CCP

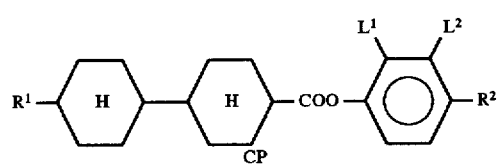
CP

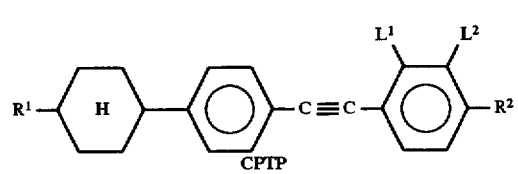
CPTP

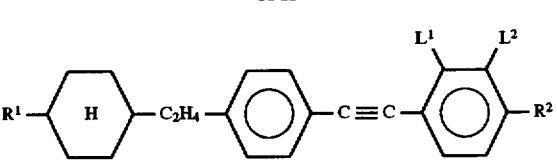
CEPTP

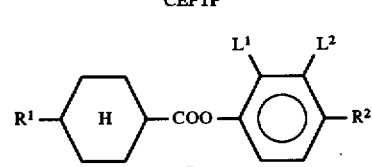
D

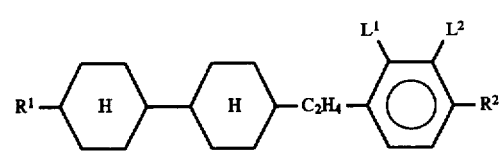
ECCP

TABLE A-continued
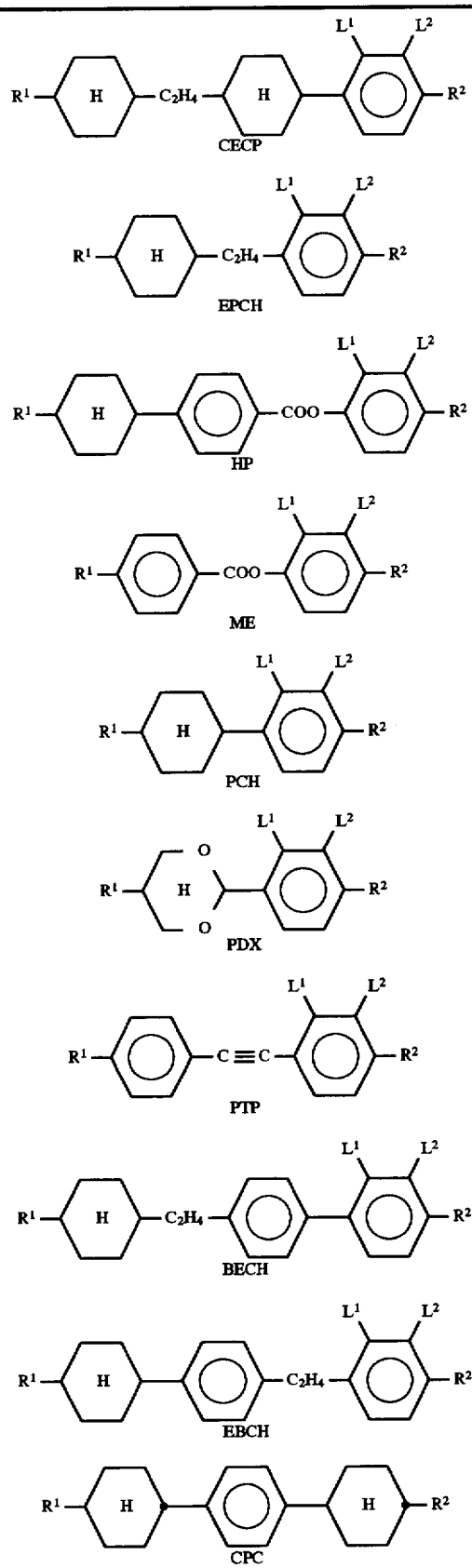
TABLE A-continued
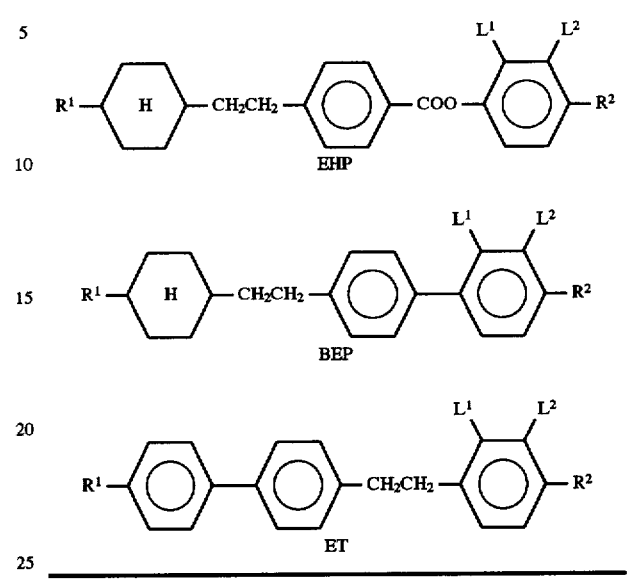
TABLE B
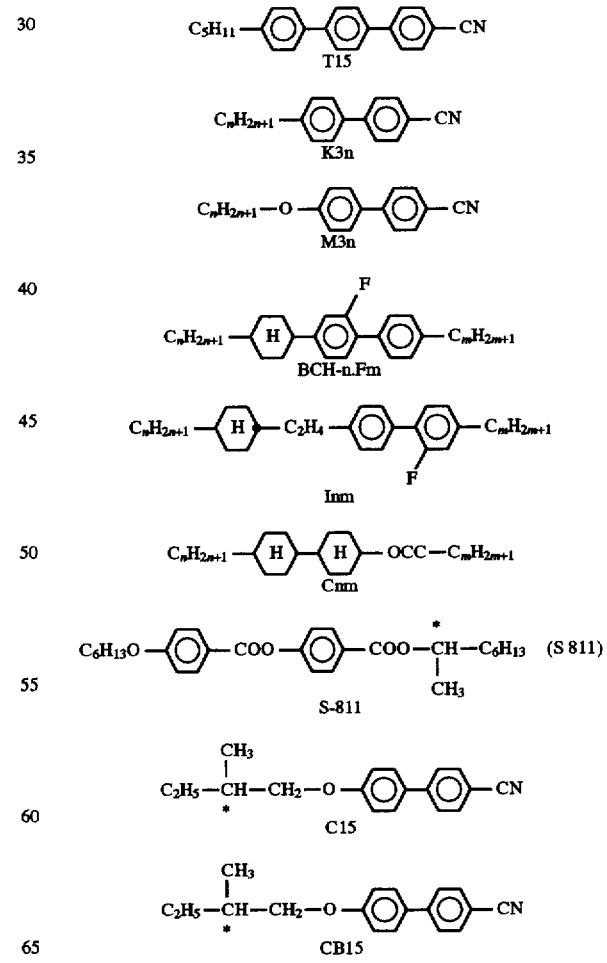

TABLE B-continued $C_nH_{2n+1}$—[H]—[◯]—[◯]—[H]—$C_mH_{2m+1}$
　　　　　　　　　F
　　　　　　CBC-nmF $C_nH_{2n+1}$—[H]—$CH_2CH_2$—[◯]—CN
　　　　　　G3n $C_nH_{2n+1}$—[H]—[H]—$CH_2CH_2$—[◯]—[H]—$C_mH_{2m+1}$
　　　　　　　　CCEPC-nm $C_nH_{2n+1}$—[H]—[H]—COO—[◯]—[H]—$C_mH_{2m+1}$
　　　　　　　　CCPC-nm $C_nH_{2n+1}$—[H]—[H]—COO—[H]—$C_mH_{2m+1}$
　　　　　　　CH-nm $C_nH_{2n+1}$—[H]—[◯]—COO—[H]—$C_mH_{2m+1}$
　　　　　　　HD-nm $C_nH_{2n+1}$—[H]—$C_2H_4$—[H]—$C_mH_{2m+1}$
　　　　　　HH-nm $C_nH_{2n+1}$—[H]—COO—[H]—$C_mH_{2m+1}$
　　　　　　OS-nm $C_2H_5$—[H]—COO—[◯]—[◯]—CN
　　　　　CHE $C_nH_{2n+1}$—[H]—$C_2H_4$—[◯]—[◯]—[H]—$C_mH_{2m+1}$
　　　　　　ECBC-nm $C_nH_{2n+1}$—[H]—$C_2H_4$—[H]—$C_mH_{2m+1}$
　　　　　　ECCH-nm $C_nH_{2n+1}$—[H]—[H]—$CH_2$—O—$C_mH_{2m+1}$
　　　　　　CCH-n1EM $C_nH_{2n+1}$—[◯]—[◯]—[◯]—CN
　　　　　　　F
　　　　　T-nFN $C_nH_{2n+1}$—[◯]—[◯]—CN
　　　　　　F
　　　　B-OFN

EXAMPLE 1

A STN display with the following parameters:

| twist angle | 240° |
|---|---|
| bias | 1:16 |
| multiplex rate | 1:240 |
| frame rate | 80 Hz |

-continued

| tilt angle | 5° |
|---|---|
| d | 6.1 μm | contains a liquid crystalline medium with the following properties:

| S-N | <−30° |
|---|---|
| N-I | +84° |
| Δn | 0.1393 | consisting of an achiral base mixture:

| PCH-3 | 22.00 |
|---|---|
| ME2N.F | 3.00 |
| ME3N.F | 3.00 |
| ME5N.F | 5.00 |
| ME5N.F | 6.00 |
| CCH-34 | 20.00 |
| CCP-20CF3 | 4.00 |
| CCP-30CF3 | 3.00 |
| CCP-40CF3 | 3.00 |
| CPTP-301 | 5.00 |
| CPTP-302 | 5.00 |
| CPTP-303 | 4.00 |
| ECCP-31 | 4.00 |
| ECCP-32 | 4.00 |
| ECCP-33 | 4.00 |
| PTP-20F | 7.00 | and being doped with 0.61% of $C_6H_{13}O$—[◯]—COO—[◯]—COO—*$\overset{*}{C}H$—$C_6H_{13}$
　　　　　　　　　　　　　　　　　　　　|
　　　　　　　　　　　　　　　　　　　　$CH_3$
　　　　　　　　　　　　　　　　　(S-811)

shows the following switching parameters:

| $T_{ave}$ | 233 ms |
|---|---|
| $V_{10}$ | 1.77 V |
| $V_{90}/V_{10}$ | 1.085 |

EXAMPLE 2

A STN display as described in Example 1 containing a liquid crystalline medium with the following parameters:

| N-I | +83° C. |
|---|---|
| Δn | 0.1407 | consisting of an achiral base mixture:

| PCH-3 | 22.00 |
|---|---|
| ME2N.F | 7.00 |
| ME3N.F | 7.00 |
| ME5N.F | 3.00 |
| CCH-34 | 20.00 |
| CCP-20CF3 | 7.00 |
| CCP-30CF3 | 5.00 |
| CPTP-303 | 7.00 |
| CPTP-302 | 8.00 |
| ECCP-32 | 4.00 |
| ECCP-33 | 3.00 |
| PTP-20F | 7.00 | being doped with 0.61% of S-811 shows the following switching parameters:

| | |
|---|---|
| $T_{ave}$ | 237 ms |
| $V_{10}$ | 1.67 V |
| $V_{90}/V_{10}$ | 1.084 |

EXAMPLE 3

A STN display as described in Example 1 containing a liquid crystalline medium with the following properties:

| | |
|---|---|
| S-N | <+20° |
| N-I | +85° |
| $\Delta n$ | 0.1412 |
| $\gamma rot$ | 113 | consisting of an achiral base mixture:

| | |
|---|---|
| PCH-3 | 27.00 |
| ME2N.F | 6.00 |
| ME2N.F | 6.00 |
| CCH-34 | 20.00 |
| CCP-20CF3 | 7.00 |
| CCP-30CF3 | 5.00 |
| CPTP-303 | 8.00 |
| CPTP-302 | 8.00 |
| ECCP-33 | 3.00 |
| ECCP-32 | 3.00 |
| PTP-20F | 7.00 | being doped with 0.61% of S-811 shows the following switching parameters:

| | |
|---|---|
| $T_{ave}$ | 243 ms |
| $V_{10}$ | 1.82 V |
| $V_{90}/V_{10}$ | 1.071 |

EXAMPLE 4

A STN display as described in Example 1 containing a liquid crystalline medium with the following properties:

| | |
|---|---|
| S-N | <-30° |
| N-I | +91° |
| $\Delta n$ | 0.1432 | consisting of an achiral base mixture:

| | |
|---|---|
| PCH-3 | 22.00 |
| ME2N.F | 3.00 |
| ME3N.F | 3.00 |
| ME5N.F | 5.00 |
| ME7N.F | 6.00 |
| PCH-302 | 15.00 |
| CCP-20CF3 | 7.00 |
| CCP-30CF3 | 7.00 |
| CCP-40CF3 | 6.00 |
| CPTP-301 | 5.00 |
| CPTP-302 | 5.00 |
| ECCP-31 | 4.00 |
| BCH-201 | 5.00 |
| BCH-301 | 7.00 | and being doped with 0.82% of S-811 shows the following switching parameters:

| | |
|---|---|
| $T_{ave}$ | 267 ms |
| $V_{10}$ | 1.73 V |
| $V_{90}/V_{10}$ | 1.072 |

EXAMPLE 5

A STN display as described in Example 1 containing a liquid crystalline medium with the following properties:

| | |
|---|---|
| S-N | <-30° |
| N-I | +88° |
| $\Delta n$ | 0.1408 | consisting of an achiral base mixture:

| | |
|---|---|
| PCH-3 | 24.00 |
| ME2N.F | 3.00 |
| ME3N.F | 3.00 |
| ME5N.F | 5.00 |
| ME7N.F | 5.00 |
| PCH-302 | 16.00 |
| CCP-20CF3 | 7.00 |
| CCP-30CF3 | 6.00 |
| CCP-40CF3 | 6.00 |
| CPTP-301 | 5.00 |
| CPTP-302 | 4.00 |
| ECCP-31 | 4.00 |
| BCH-201 | 5.00 |
| BCH-301 | 7.00 | and being doped with 0.78% of S-811 shows the following switching parameters:

| | |
|---|---|
| $T_{ave}$ | 270 ms |
| $V_{10}$ | 1.73 V |
| $V_{90}/V_{10}$ | 1.068 |

EXAMPLE 6

A STN display as described in Example 1 containing a liquid crystalline medium with the following properties:

| | |
|---|---|
| S-N | <-40° |
| N-I | +87° |
| $\Delta n$ | 0.1407 | consisting of an achiral base mixture:

| | |
|---|---|
| PCH-3 | 27.00 |
| ME2N.F | 3.00 |
| ME3N.F | 3.00 |
| ME5N.F | 4.00 |
| ME7N.F | 4.00 |
| PCH-302 | 16.00 |
| CCP-20CF3 | 6.00 |
| CCP-30CF3 | 6.00 |
| CCP-40CF3 | 6.00 |
| CPTP-301 | 5.00 |
| CPTP-302 | 4.00 |
| ECCP-31 | 4.00 |
| BCH-201 | 5.00 |
| BCH-301 | 7.00 | and being doped with 0.79% S-811 shows the following switching parameters:

| | |
|---|---|
| $T_{ave}$ | 272 ms |
| $V_{10}$ | 1.78 V |
| $V_{90}/V_{10}$ | 1.064 |

EXAMPLE 7

A STN display as described in Example 1 containing a liquid crystalline medium with the following properties:

| | |
|---|---|
| N-I | 90.7° |
| Δn | 0.1431 | consisting of an achiral base mixture:

| | |
|---|---|
| PCH-3 | 27.00 |
| ME2N.F | 6.00 |
| ME3N.F | 6.00 |
| CCP-20CF3 | 7.00 |
| CCP-30CF3 | 7.00 |
| CPTP-302 | 8.00 |
| CPTP-303 | 8.00 |
| PTP-20F | 4.00 |
| CCH-34 | 20.00 |
| BCH-201 | 7.00 | and being doped with 0.61% S-811 shows the following switching parameters:

| | |
|---|---|
| $T_{ave}$ | 230 ms |
| $V_{10}$ | 1.85 V |
| $V_{90}/V_{10}$ | 1.07 |

EXAMPLE 8

A STN display as described in Example 1 containing a liquid crystalline medium with the following properties:

| | |
|---|---|
| N-I | +87.5° |
| Δn | 0.1411 | consisting of an achiral base mixture:

| | |
|---|---|
| PCH-3 | 22.00 |
| ME2N.F | 6.00 |
| ME3N.F | 6.00 |
| CCP-20CF3 | 8.00 |
| CCP-30CF3 | 8.00 |
| CPTP-302 | 7.00 |
| CPTP-303 | 7.00 |
| K6 | 8.00 |
| CCH-34 | 21.00 |
| BCH-201 | 7.00 | and being doped with 0.61% S-811 shows the following switching parameters:

| | |
|---|---|
| $T_{ave}$ | 224 ms |
| $V_{10}$ | 1.72 V |
| $V_{90}/V_{10}$ | 1.081 |

EXAMPLE 9

A STN display as described in Example 1 containing a liquid crystalline medium with the following properties:

| | |
|---|---|
| N-I | +87° |
| Δn | 0.1429 | consisting of an achiral base mixture:

| | |
|---|---|
| PCH-3 | 27.00 |
| ME2N.F | 6.00 |
| ME3N.F | 6.00 |
| CCP-20CF3 | 7.00 |
| CCP-30CF3 | 7.00 |
| CPTP-302 | 8.00 |
| CPTP-303 | 8.00 |
| PTP-20F | 4.00 |
| CCH-31 | 5.00 |
| CCH-33 | 7.00 |
| CCH-34 | 8.00 |
| BCH-201 | 7.00 | and being doped with 0.61% S-811 shows the following switching parameters:

| | |
|---|---|
| $T_{ave}$ | 219 ms |
| $V_{10}$ | 1.80 V |
| $V_{90}/V_{10}$ | 1.072 |

EXAMPLE 10

A STN display as described in Example 1 containing a liquid crystalline medium with the following properties:

| | |
|---|---|
| N-I | +87.5° |
| Δn | 0.1407 | consisting of an achiral base mixture:

| | |
|---|---|
| PCH-3 | 20.00 |
| PCH-4 | 7.00 |
| ME2N.F | 4.00 |
| ME3N.F | 4.00 |
| ME5N.F | 4.00 |
| CCP-20CF3 | 5.00 |
| CCP-30CF3 | 5.00 |
| CCP-40CF3 | 4.00 |
| CPTP-301 | 5.00 |
| CPTP-302 | 6.00 |
| CPTP-303 | 5.00 |
| PTP-20F | 4.00 |
| CCH-32 | 10.00 |
| CCH-34 | 10.00 |
| BCH-301 | 3.00 |
| BCH-201 | 4.00 | and being doped with 0.61% S-811 shows the following switching parameters:

| | |
|---|---|
| $T_{ave}$ | 234 ms |
| $V_{10}$ | 1.82 V |
| $V_{90}/V_{10}$ | 1.071 |

EXAMPLE 11

A STN display as described in Example 1 containing a liquid crystalline medium with the following properties:

| | |
|---|---|
| N-I | +85 |
| Δn | 0.1417 | consisting of an achiral base mixture:

| | |
|---|---|
| PCH-3 | 20.00 |
| PCH-4 | 9.00 |
| ME2N.F | 2.00 |
| ME3N.F | 2.00 |
| CCP-20CF3 | 5.00 |
| CCP-30CF3 | 5.00 |
| CCP-40CF3 | 4.00 |
| CPTP-301 | 5.00 |
| CPTP-302 | 5.00 |
| CPTP-303 | 5.00 |
| PTP-20F | 4.00 |
| K6 | 7.00 |
| CCH-32 | 10.00 |
| CCH-34 | 10.00 |
| BCH-301 | 2.00 |
| BCH-201 | 5.00 | and being doped with 0.61% S-811 shows the following switching parameters:

| | |
|---|---|
| $T_{ave}$ | 220 ms |
| $V_{10}$ | 1.94 V |
| $V_{90}/V_{10}$ | 1.077 |

EXAMPLE 12

A STN display as described in Example 1 containing a liquid crystalline medium with the following properties:

| | |
|---|---|
| N-I | +86° |
| Δn | 0.1427 | consisting of an achiral base mixture:

| | |
|---|---|
| PCH-3 | 25.00 |
| ME2N.F | 3.00 |
| ME3N.F | 3.00 |
| ME5N.F | 6.00 |
| ME7N.F | 5.00 |
| CCP-20CF3 | 4.00 |
| CCP-30CF3 | 4.00 |
| CCP-40CF3 | 4.00 |
| CPTP-301 | 5.00 |
| CPTP-302 | 5.00 |
| CPTP-303 | 5.00 |
| PTP-20F | 4.00 |
| CCH-34 | 20.00 |
| BCH-201 | 7.00 | and being doped with 0.61% S-811 shows the following switching parameters:

| | |
|---|---|
| $T_{ave}$ | 243 ms |
| $V_{10}$ | 1.71 V |
| $V_{90}/V_{10}$ | 1.082 |

EXAMPLE 13

A STN display as described in Example 1 containing a liquid crystalline medium with the following properties:

| | |
|---|---|
| N-I | +84.5° |
| Δn | 0.1386 | consisting of an achiral base mixture:

| | |
|---|---|
| PCH-3 | 27.00 |
| PCH-4 | 4.00 |
| PCH-302 | 5.00 |
| CCP-20CF3 | 6.00 |
| CCP-30CF3 | 5.00 |
| CPTP-301 | 4.00 |
| CPTP-302 | 5.00 |
| CPTP-303 | 5.00 |
| PTP-20F | 5.00 |
| K6 | 7.00 |
| CCH-34 | 20.00 |
| BCH-302 | 7.00 | and being doped with 0.61% S-811 shows the following switching parameters:

| | |
|---|---|
| $T_{ave}$ | 211 ms |
| $V_{10}$ | 2.11 V |
| $V_{90}/V_{10}$ | 1.062 |

EXAMPLE 14

A STN display as described in Example 1 containing a liquid crystalline medium with the following properties:

| | |
|---|---|
| N-I | +88.5° |
| Δn | 0.140 | consisting of an achiral base mixture:

| | |
|---|---|
| PCH-3 | 22.00 |
| PCH-4 | 6.00 |
| ME2N.F | 3.00 |
| ME3N.F | 3.00 |
| ME5N.F | 5.00 |
| CCP-20CF3 | 5.00 |
| CCP-30CF3 | 5.00 |
| CCP-40CF3 | 4.00 |
| CPTP-301 | 5.00 |
| CPTP-302 | 6.00 |
| CPTP-303 | 5.00 |
| PTP-20F | 4.00 |
| CCH-32 | 10.00 |
| CCH-34 | 10.00 |
| BCH-301 | 4.00 |
| BCH-302 | 3.00 | and being doped with 0.61% S-811 shows the following switching parameters:

| | |
|---|---|
| $T_{ave}$ | 227 ms |
| $V_{10}$ | 1.89 V |
| $V_{90}/V_{10}$ | 1.069 |

EXAMPLE 15

A STN display with the following parameters:

| | |
|---|---|
| twist | 220° |
| bias | 1:4 |
| multiplex rate | 1:16 |
| frame rate | 80 Hz |
| tilt angle | 5° |
| d | 6.8 µm | contains a liquid crystalline medium with the following properties:

| | |
|---|---|
| S-N | <−14° |
| N-I | +82° |
| Δn | 0.1346 | consisting of an achiral base material:

| | |
|---|---|
| PCH-3 | 18.00 |
| PCH-4 | 7.00 |
| PCH-5 | 6.00 |
| ME-2N.F | 3.00 |
| ME-3N.F | 4.00 |
| ME-5N.F | 3.00 |
| B-10.FN | 7.00 |
| B-20.FN | 7.00 |
| CCP-20CF3 | 6.00 |
| CCP-30CF3 | 7.00 |
| CCP-40CF3 | 6.00 |
| CCP-50CF3 | 6.00 |
| BCH-301 | 3.00 |
| BCH-302 | 4.00 |
| CCH-34 | 9.00 |
| CCPC-33 | 4.00 | and being doped with 0.61% of S-811 shows the following switching properties:

| | |
|---|---|
| $T_{ave}$ | 147 ms |
| $V_{10}$ | 1.53 V |
| $V_{90}/V_{10}$ | 1.075 |

COMPARATIVE EXAMPLE 1

A STN display as described in Example 8 contains a medium with the following properties:

| | |
|---|---|
| S-N | −30° |
| N-I | +88° |
| Δn | 0.1398 | consisting of

| | |
|---|---|
| PCH-3 | 22.00 |
| ME2N.F | 3.00 |
| ME3N.F | 3.00 |
| ME5N.F | 5.00 |
| ME7N.F | 6.00 |
| PCH-302 | 15.00 |
| ECCP-3F.F | 4.00 |
| ECCP-5F.F | 4.00 |
| CCP-20CF3 | 4.00 |
| CCP-30CF3 | 4.00 |
| CCP-40CF3 | 4.00 |
| CPTP-301 | 5.00 |
| CPTP-302 | 5.00 |
| CPTP-303 | 5.00 |
| ECCP-31 | 4.00 |
| ECCP-32 | 4.00 |
| ECCP-33 | 3.00 | and being doped with 0.61% of S-811 shows the following switching parameters:

| | |
|---|---|
| $T_{ave}$ | 295 ms |
| $V_{10}$ | 1.79 V |
| $V_{90}/V_{10}$ | 1.067 |

This comparison clearly shows that with the aid of bicyclohexanyles of formula I1 and/or cyclohexylbiphenyl of formula I2 switching times can be considerably improved.

EXAMPLE 16

A STN display as described in Example 1 containing a liquid crystalline medium with the following properties:

| | |
|---|---|
| S-N | <−15° |
| N-I | +71° |
| Δn | 0.1399 | consisting of an achiral base material

| | |
|---|---|
| PCH-3 | 25.00 |
| PCH-4 | 14.00 |
| PCH-302 | 20.00 |
| PCH-304 | 6.00 |
| PTP-102 | 6.00 |
| CPTP-301 | 4.00 |
| CPTP-302 | 3.00 |
| BCH-301 | 10.00 |
| BCH-302 | 5.00 |
| CCH-34 | 7.00 | and being doped with S-811 shows the following switching properties:

| | |
|---|---|
| $T_{ave}$ | 226 ms |
| $V_{10}$ | 2.25 V |
| $V_{90}/V_{10}$ | 1.043 |

COMPARATIVE EXAMPLE 2

A STN display as described in Example 16 containing a liquid crystalline medium with the following properties:

| | |
|---|---|
| S-N | <−40° |
| N-I | +74° |
| Δn | 0.1383 | consisting of an achiral base material

| | |
|---|---|
| G9 | 10.00 |
| PCH-3 | 24.00 |
| PCH-5 | 5.00 |
| PCH-302 | 16.00 |

-continued

| CP-30CF3 | 5.00 |
| --- | --- |
| ECCP-31 | 6.00 |
| ECCP-32 | 5.00 |
| ECCP-33 | 5.00 |
| PTP-102 | 6.00 |
| PTP-201 | 6.00 |
| BCH-32 | 6.00 |
| BCH-52 | 6.00 | and being doped with S-811 shows the following properties:

| $T_{ave}$ | 231 ms |
| --- | --- |
| $V_{10}$ | 2.29 V |
| $V_{90}/V_{10}$ | 1.052 |

EXAMPLE 17

A STN display with the following parameters:

| twist angle | 240° |
| --- | --- |
| d | 4.9 μm | contains a liquid crystalline medium with the following parameters:

| N-I | +86° |
| --- | --- |
| ΔN | +0.1749 | consisting of an achiral base mixture:

| K6 | 9.00 |
| --- | --- |
| K9 | 8.00 |
| K15 | 9.00 |
| BCH-32 | 8.00 |
| CCH-34 | 8.00 |
| CCH-35 | 8.00 |
| PCH-301 | 8.00 |
| CCP-30CF3 | 5.00 |
| CCP-40CF3 | 5.00 |
| PTP-102 | 6.00 |
| PTP-201 | 6.00 |
| CPTP-301 | 5.00 |
| CPTP-302 | 7.00 | being doped with S-811 shows the following switching properties:

| $T_{ave}$ | 87 ms |
| --- | --- |
| $V_{10}$ | 2.32 V |
| $V_{90}/V_{10}$ | 1.112 |

EXAMPLE 18

A STN display as described in Example 17 contains a liquid crystalline medium with the following parameters:

| N-I | +81° |
| --- | --- |
| Δn | +0.1719 | consisting of an achiral base mixture:

| K6 | 8.00 |
| --- | --- |
| K9 | 6.00 |
| PCH-3 | 10.00 |
| BCH-32 | 5.00 |
| CCH-34 | 10.00 |
| PCH-301 | 13.00 |
| PTP-20F | 6.00 |
| PTP-40F | 6.00 |
| CCP-20CF3 | 4.00 |
| CCp-30CF3 | 4.00 |
| CCP-40CF3 | 4.00 |
| ECCP-31 | 4.00 |
| PTP-102 | 4.00 |
| PTP-201 | 4.00 |
| CPTP-301 | 5.00 |
| CPTP-302 | 7.00 | being doped with S811 shows the following switching properties:

| $T_{ave}$ | 98 ms |
| --- | --- |
| $V_{10}$ | 2.24 V |
| $V_{90}/V_{10}$ | 1.089 |

EXAMPLE 19

Preparation of

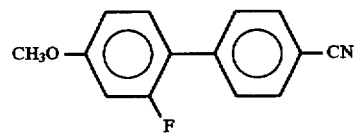

(B-10.FN)

A mixture of 0.3 moles of 4-bromobenzonitrile, 0.33 moles of 2-fluoro-4-methoxyphenylboronic acid, 75 ml of toluene, 350 ml of ethanol, 490 ml of a 2 m sodium carbonate solution and 9.1 g of tetrakis(triphenyl(phosphin)) palladium (O) is heated 3.5 hrs under reflux. After usual work-up and crystallization from ethanol the pure product is obtained, K 82 N (45.3) I.

Analogously the following compounds are obtained:

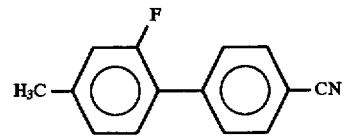

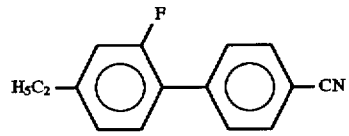

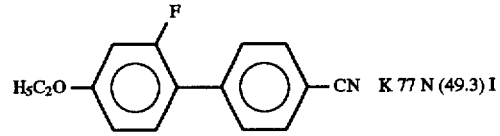  K 77 N (49.3) I

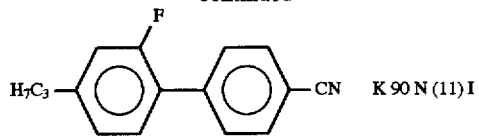 K 90 N (11) I

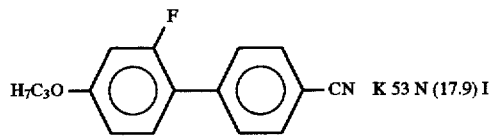 K 53 N (17.9) I

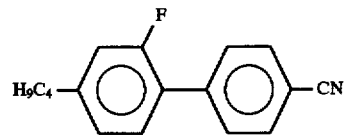 CN

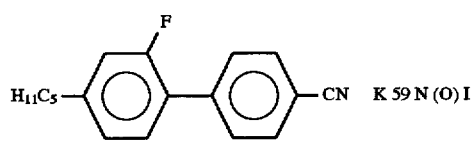 K 59 N (0) I

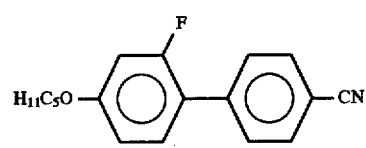 CN

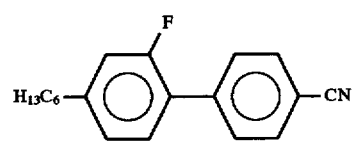 CN

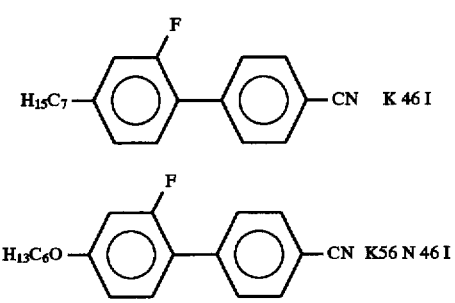

(top to bottom: K 46 I; K56 N 46 I)

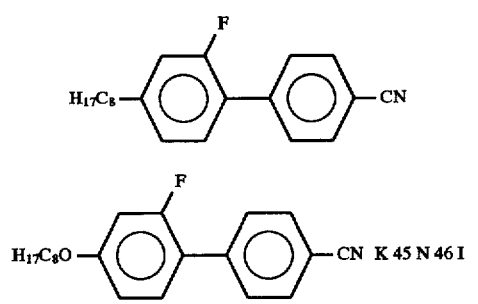

(top to bottom: (no transition data); K 45 N 46 I)

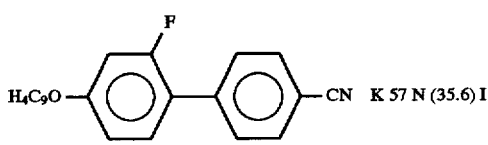 K 57 N (35.6) I

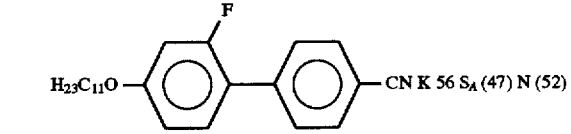 K 56 S$_A$ (47) N (52)

EXAMPLE 20

A STN display with the following parameters:

| | |
|---|---|
| twist angle | 240° |
| bias | 1:16 |
| multiplex rate | 1:240 |
| frame rate | 80 Hz |
| tilt angle | 5° |
| d | 6.1 μm | contains a liquid crystalline medium with the following properties:

| | |
|---|---|
| S-N | −40° |
| N-I | +88° |
| Δn | 0.1391 | consisting of an achiral base mixture:

| | |
|---|---|
| PCH-3 | 22.00 |
| ME2N.F | 3.00 |
| ME3N.F | 3.00 |
| B-10.FN | 6.00 |
| B-20.FN | 5.00 |
| PCH-302 | 15.00 |
| CCH-34 | 3.00 |
| ECCP-3F.F | 4.00 |
| ECCP-5F.F | 4.00 |
| CCP-2OCF3 | 4.00 |
| CCP-3OCF3 | 4.00 |
| CCP-4OCF3 | 4.00 |
| CPTP-301 | 5.00 |
| CPTP-302 | 5.00 |
| ECCP-31 | 4.00 |
| ECCP-32 | 4.00 |
| ECCP-33 | 4.00 |
| CCPC-33 | 2.00 | and being doped with 0.61% of S-811 shows the following switching parameters:

| | |
|---|---|
| T$_{ave}$ | 289 ms |
| V$_{10}$ | 1.91 V |
| V$_{90}$/V$_{10}$ | 1.049 |

EXAMPLE 21

A STN display as described in Example 20 containing a liquid crystalline medium with the following parameters:

| | |
|---|---|
| S-N | <0° |
| N-I | +89° |
| Δn | 0.1401 | consisting of an achiral base mixture:

| | | |
|---|---|---|
| PCH-3 | 22.00 | |
| ME2N.F | 3.00 | |
| ME3N.F | 3.00 | |
| B-10.FN | 7.00 | |
| B-20.FN | 7.00 | |
| PCH-302 | 8.00 | |
| CCH-34 | 10.00 | |
| CCP-20CF3 | 7.00 | |
| CCF-30CF3 | 7.00 | |
| CCF-40CF3 | 6.00 | |
| CPTP-301 | 5.00 | |
| CPTP-302 | 5.00 | |
| ECCP-31 | 4.00 | |
| ECCP-32 | 4.00 | |
| CCPC-33 | 2.00 | | being doped with 0.61% of S-811 shows the following switching parameters:

| | |
|---|---|
| $T_{av}$ | 266 ms |
| $V_{10}$ | 1.83 V |
| $V_{90}/V_{10}$ | 1.051 |

EXAMPLE 22

A STN display as described in Example 20 containing a liquid crystalline medium with the following properties:

| | |
|---|---|
| S-N | <+20° |
| N-I | +89° |
| Δn | 0.1424 | consisting of an achiral base mixture:

| | |
|---|---|
| PCH-3 | 22.00 |
| B-10.FN | 7.00 |
| B-20.FN | 7.00 |
| B-30.FN | 5.00 |
| B-40.FN | 5.00 |
| CCH-34 | 16.00 |
| CCP-20CF3 | 7.00 |
| CCP-30CF3 | 7.00 |
| CCP-40CF3 | 6.00 |
| CPTP-301 | 4.00 |
| CPTP-302 | 4.00 |
| ECCP-31 | 4.00 |
| ECCP-32 | 4.00 |
| ECCP-33 | 2.00 | being doped with 0.61% of S-811 shows the following switching parameters:

| | |
|---|---|
| $T_{av}$ | 279 ms |
| $V_{10}$ | 1.88 V |
| $V_{90}/V_{10}$ | 1.052 |

EXAMPLE 23

A STN display as described in Example 20 containing a liquid crystalline medium with the following properties:

| | |
|---|---|
| S-N | <−40° |
| N-I | +90° |
| Δn | 0.1403 | consisting of an achiral base mixture:

| | |
|---|---|
| PCH-3 | 22.00 |
| ME2N.F | 3.00 |
| ME3N.F | 3.00 |
| B-10.FN | 6.00 |
| B-20.FN | 6.00 |
| PCH-302 | 13.00 |
| ECCP-3F.F | 4.00 |
| ECCP-5F.F | 4.00 |
| CCP-20CF3 | 7.00 |
| CCP-30CF3 | 7.00 |
| CCP-40CF3 | 6.00 |
| CPTP-301 | 4.00 |
| CPTP-302 | 5.00 |
| ECCP-31 | 4.00 |
| ECCP-32 | 4.00 |
| ECCP-33 | 4.00 |
| CCPC-33 | 2.00 | and being doped with 0.61% of S-811 shows the following switching parameters:

| | |
|---|---|
| $T_{av}$ | 295 ms |
| $V_{10}$ | 1.82 V |
| $V_{90}/V_{10}$ | 1.050 |

COMPARATIVE EXAMPLE 3

A STN display as described in Example 20 contains a liquid crystalline medium with the following parameters

| | |
|---|---|
| S-N | −30° |
| N-I | 88° |
| Δn | 0.1398 | consisting of

| | |
|---|---|
| PCH-3 | 22.00 |
| ME2N.F | 3.00 |
| ME3N.F | 3.00 |
| ME5N.F | 5.00 |
| ME7N.F | 6.00 |
| PCH-302 | 15.00 |
| ECCP-3F.F | 4.00 |
| ECCP-5F.F | 4.00 |
| CCP-20CF3 | 4.00 |
| CCP-30CF3 | 4.00 |
| CCP-40CF3 | 4.00 |
| CPTP-301 | 5.00 |
| CPTP-302 | 5.00 |
| CPTP-303 | 5.00 |
| ECCP-31 | 4.00 |
| ECCP-32 | 4.00 |
| ECCP-33 | 3.00 | and being doped with 0.61% of S-811 shows the following switching parameters:

| | |
|---|---|
| $T_{ave}$ | 295 ms |
| $V_{10}$ | 1.79 V |
| $V_{90}/V_{10}$ | 1.067 |

This comparison clearly shows that the replacement of cyanophenyl benzoate (ME-nN.F) compounds by laterally fluorinated cyanobiphenyls B-nO.FN yields better steepness and/or shorter switching times.

EXAMPLE 24

A STN display with the following parameters:

| | |
|---|---|
| twist | 240 |
| bias | 1:16 |
| multiplex rate | 1:240 |
| frame rate | 40 Hz |
| tilt angle | 5° |
| d | 6.1 μm | contains a medium with the following properties:

| | |
|---|---|
| S-N | <−15° |
| N-I | +74° |
| Δn | 0.1405 | consisting of an achiral base material:

| | |
|---|---|
| PCH-3 | 23.00 |
| PCH-302 | 20.00 |
| PCH-304 | 8.00 |
| PTP-102 | 4.50 |
| CPTP-301 | 6.00 |
| CPTP-302 | 6.00 |
| CPTP-303 | 5.00 |
| B-10.FN | 7.00 |
| CCH-32 | 3.50 |
| CCH-34 | 12.00 |
| CCP-30CF3 | 5.00 | and being doped with 0.85% of S-811 shows the following switching properties:

| | |
|---|---|
| $T_{ave}$ | 223 ms |
| $V_{10}$ | 2.28 V |
| $V_{90}/V_{10}$ | 1.042 |

COMPARATIVE EXAMPLE 4

A STN display as described in Example 24 contains a medium with the following properties:

| | |
|---|---|
| S-N | <−40° |
| N-I | +74° |
| Δn | 0.1383 | consisting of an achiral base material:

| | |
|---|---|
| G9 | 10.00 |
| PCH-3 | 24.0 |
| PCH-5 | 5.00 |
| PCH-302 | 16.00 |
| CP-30CF3 | 5.00 |
| ECCP-31 | 6.00 |
| ECCP-32 | 5.00 |
| ECCP-33 | 5.00 |
| PTP-102 | 6.00 |
| PTP-201 | 6.00 |
| BCH-32 | 6.00 |
| BCH-52 | 6.00 | and being doped with 0.86% of S-811 shows the following switching properties:

| | |
|---|---|
| $T_{ave}$ | 238 ms |
| $V_{10}$ | 2.29 V |
| $V_{90}/V_{10}$ | 1.055 |

This comparison clearly shows that the switching times and the steepness can be improved with the aid of B-nO.FN.

EXAMPLE 25

A STN display as described in Example 20 contains a mixture with the following properties:

| | |
|---|---|
| S-N | <0° |
| K-I | +84° |
| Δn | 0.1293 | consisting of an achiral base material

| | |
|---|---|
| ME2N.F | 3.00 |
| B-10.FN | 5.00 |
| B-20.FN | 5.00 |
| PCH-2 | 9.00 |
| PCH-3 | 26.00 |
| CCH-34 | 11.00 |
| CCP-20CF3 | 5.00 |
| CCP-30CF3 | 6.00 |
| CCP-40CF3 | 5.00 |
| BCH-32 | 7.00 |
| ECCP-3 | 5.00 |
| ECCP-31 | 5.00 |
| ECCP-32 | 5.00 |
| CPTP-302 | 3.00 | and being doped with 0.75% of S-811 shows the following switching properties:

| | |
|---|---|
| $T_{ave}$ | 310 ms |
| $V_{10}$ | 1.83 V |
| $V_{90}/V_{10}$ | 1.049 |

COMPARATIVE EXAMPLE 5

A STN display as described in Example 25 contains a medium with the following properties

| | |
|---|---|
| S-N | <−40° |
| K-I | +84° |
| Δn | 0.1287 | consisting of an achiral base material:

| | |
|---|---|
| ME2N.F | 3.00 |
| ME3N.F | 3.00 |
| ME5N.F | 5.00 |
| PCH-2 | 9.00 |
| PCH-3 | 26.00 |
| PCH-302 | 9.00 |
| CCP-20CF3 | 5.00 |
| CCP-30CF3 | 6.00 |
| CCP-40CF3 | 5.00 |
| BCH-32 | 7.00 |
| ECCP-3 | 5.00 |
| ECCP-31 | 6.00 |
| ECCP-32 | 6.00 |
| CPTP-301 | 3.00 |
| CPTP-302 | 2.00 | and being doped with 0.73% of S-811 shows the following switching properties:

| | |
|---|---|
| $T_{ave}$ | 337 ms |
| $V_{10}$ | 1.75 V |
| $V_{90}/V_{10}$ | 1.051 |

EXAMPLE 26

A STN display as described in Example 20 contains a medium with the following properties:

| | |
|---|---|
| K-I | +74.5° |
| Δn | 0.1425 | consisting of an achiral base material:

| | |
|---|---|
| ME2N.F | 3.00 |
| ME3N.F | 5.00 |
| ME5N.F | 15.00 |
| ME7N.F | 5.00 |
| HP-3N.F | 4.00 |
| PCH-3 | 19.00 |
| PCH-302 | 4.00 |
| CCPC-33 | 5.00 |
| CPTP-301 | 5.00 |
| CPTP-302 | 5.00 |
| CBC-33F | 2.00 |
| CCH-32 | 9.00 |
| CCH-34 | 12.00 |
| B-10.FN | 3.00 |
| B-20.FN | 4.00 | and being doped with S-811 shows the following switching parameters:

| | |
|---|---|
| $T_{ave}$ | 313 ms |
| $V_{10}$ | 1.33 V |
| $V_{90}/V_{10}$ | 1.068 |

COMPARATIVE EXAMPLE 6

A STN display as described in Example 26 contains a medium with the following properties:

| | |
|---|---|
| K-I | +74.5° |
| Δn | 0.1460 | consisting of an achiral base material:

| | |
|---|---|
| ME2N.F | 3.00 |
| ME3N.F | 5.00 |
| ME5N.F | 10.00 |
| HP-3N.F | 4.00 |
| HP-4N.F | 4.00 |
| PYP-5F | 8.00 |
| K6 | 8.00 |
| PCH-301 | 10.00 |
| PCH-302 | 10.00 |
| CCH-303 | 14.00 |
| ECCP- | 4.00 |
| CPTP-301 | 4.00 |
| CPTP-302 | 3.00 |
| CPTP-303 | 5.00 |
| CBC-33F | 4.00 |
| CBC-53F | 4.00 | and being doped with S-811 shows the following switching parameters:

| | |
|---|---|
| $T_{ave}$ | 290 |
| $V_{10}$ | 1.46 V |
| $V_{90}/V_{10}$ | 1.078 |

EXAMPLE 27

A STN display as describes in Example 20 contains a medium with the following properties:

| | |
|---|---|
| K-I | +110.0° |
| Δn | 0.1263 | consisting of an achiral base material:

| | |
|---|---|
| B-10.NF | 7.00 |
| B-20.NF | 6.00 |
| ME2N | 3.00 |
| ME2N.F | 2.00 |
| ME3N.F | 3.00 |
| PCH-302 | 11.00 |
| CCH-301 | 5.00 |
| ECCP-3F.F | 10.00 |
| ECCP-5F.F | 10.00 |
| CCP-20CF3 | 6.00 |
| CCP-30CF3 | 6.00 |
| CCP-40CF3 | 6.00 |
| CCP-50CF3 | 6.00 |
| ECCP-3 | 9.00 |
| CBC-33F | 5.00 |
| CBC-53F | 5.00 | and being doped withe S-811 shows the following switching properties:

| $V_{10}$ | 2.10 V |
|---|---|
| $V_{90}/V_{10}$ | 1.052 |

EXAMPLE 28

A STN display with the following parameters:

| twist angle | 240° |
|---|---|
| bias | 1:16 |
| multiplex rate | 1:240 |
| frame rate | 80 Hz |
| tilt angle | ≈5°–6° |
| d | 5.3 μm | contains a liquid crystalline medium with the following properties:

| S-N | <−30° |
|---|---|
| N-I | +78° |
| Δn | 0.1614 | consisting of an achiral base mixture:

| PCH-2 | 16.00 |
|---|---|
| ME2N.F | 3.00 |
| PCH-301 | 7.00 |
| K6 | 5.00 |
| K9 | 5.00 |
| PYP-5F | 10.00 |
| CCH-34 | 15.00 |
| CP-33F | 5.00 |
| CPTP-301 | 6.00 |
| CPTP-302 | 6.00 |
| CPTP-303 | 6.00 |
| CPTP-30CF3 | 6.00 |
| CPTP-50CF3 | 6.00 |
| PTP-201 | 4.00 | and being doped with 0.95% of S-811 shows the following switching parameters:

| $T_{ave}$ | 142 ms |
|---|---|
| $V_{10}$ | 1.77 V |
| $V_{90}/V_{10}$ | 1.073 |

EXAMPLE 29

A STN display as described in Example 28 containing a liquid crystalline medium with the following parameters:

| S-N | <−30° |
|---|---|
| N-I | +79° |
| Δn | 0.1635 | consisting of an achiral base mixture:

| PCH-3 | 12.00 |
|---|---|
| ME2N.F | 2.00 |
| ME3N.F | 2.00 |
| PCH-301 | 13.00 |
| CCH-34 | 15.00 |
| K6 | 5.00 |
| K9 | 5.00 |
| CPTP-303 | 6.00 |
| CPTP-302 | 6.00 |
| CPTP-301 | 6.00 |
| CP-33F | 2.00 |
| PTP-201 | 4.00 |
| PYP-5F | 10.00 |
| CPTP-30CF3 | 6.00 |
| CPTP-50CF3 | 6.00 | being doped with 0.97% of S-811 shows the following switching parameters:

| $T_{ave}$ | 128 ms |
|---|---|
| $V_{10}$ | 1.90 V |
| $V_{90}/V_{10}$ | 1.073 |

EXAMPLE 30

A STN display as described in Example 28 containing a liquid crystalline medium with the following properties:

| S-N | <−40° |
|---|---|
| N-I | +108° |
| Δn | 0.1450 | consisting of an achiral base mixture:

| PCH-2 | 13.0 |
|---|---|
| PCH-3 | 18.0 |
| PCH-4 | 4.0 |
| PCH-5 | 4.0 |
| CCH-34 | 15.0 |
| CPTP-301 | 7.0 |
| CPTP-302 | 7.0 |
| CPTP-303 | 7.0 |
| BCH-32 | 11.0 |
| CP-33F | 7.0 |
| CP-35F | 7.0 | being doped with 0.92% of S-811 shows the following switching parameters:

| $T_{ave}$ | 248 ms |
|---|---|
| $V_{10}$ | 2.40 V |
| $V_{90}/V_{10}$ | 1.048 |

EXAMPLE 31

A STN display as described in Example 28 and a cell gap of 5.9 μm containing a liquid crystalline medium with the following properties:

| S-N | <−40° |
|---|---|
| N-I | +110° |
| Δn | 0.1451 | consisting of an achiral base mixture:

| | |
|---|---|
| PCH-2 | 6.0 |
| PCH-3 | 20.00 |
| PCH-5 | 6.0 |
| ME2N.F | 4.0 |
| ME3N.F | 3.0 |
| CCH-34 | 16.0 |
| CPTP-301 | 6.0 |
| CPTP-302 | 6.0 |
| CPTP-303 | 6.0 |
| BCH-32 | 11.0 |
| CP-33F | 7.0 |
| CP-35F | 7.0 |
| CBC-33 | 2.0 | and being doped with 0.92% of S-811 shows the following switching parameters:

| | |
|---|---|
| $T_{ave}$ | 250 ms |
| $V_{10}$ | 2.12 V |
| $V_{90}/V_{10}$ | 1.054 |

EXAMPLE 32

A STN display as described in Example 28 and a cell gap of 6.3 μm containing a liquid crystalline medium with the following properties:

| | |
|---|---|
| S-N | <−40° |
| N-I | +108° |
| Δn | 0.1350 | consisting of an achiral base mixture:

| | |
|---|---|
| PCH-2 | 13.0 |
| PCH-3 | 18.0 |
| PCH-4 | 4.0 |
| PCH-5 | 4.0 |
| CCH-34 | 12.0 |
| CPTP-301 | 5.0 |
| CPTP-302 | 5.0 |
| CPTP-303 | 6.0 |
| BCH-32 | 9.0 |
| CP-33F | 8.0 |
| CP-35F | 8.0 |
| CP-55F | 8.0 | and being doped with 0.85% of S-811 shows the following switching parameters:

| | |
|---|---|
| $T_{ave}$ | 340 ms |
| $V_{10}$ | 2.43 V |
| $V_{90}/V_{10}$ | 1.098 |

EXAMPLE 33

A STN display as described in Example 28 and a cell gap of 6.3 μm containing a liquid crystalline medium with the following properties:

| | |
|---|---|
| S-N | <−20° |
| N-I | +113° |
| Δn | 0.1357 | consisting of an achiral base mixture:

| | |
|---|---|
| PCH-2 | 6.0 |
| PCH-3 | 20.0 |
| PCH-5 | 6.0 |
| ME2N.F | 4.0 |
| ME3N.F | 3.0 |
| CCH-34 | 17.0 |
| CPTP-301 | 3.0 |
| CPTP-302 | 4.0 |
| CPTP-303 | 3.0 |
| BCH-32 | 11.0 |
| CP-33F | 7.0 |
| CP-35F | 7.0 |
| CBC-33 | 5.0 |
| CBC-53 | 4.0 | and being doped with 0.86% S-811 shows the following switching parameters:

| | |
|---|---|
| $T_{ave}$ | 295 ms |
| $V_{10}$ | 2.15 V |
| $V_{90}/V_{10}$ | 1.066 |

EXAMPLE 34

A STN display as described in Example 28 and a cell gap of 6.3 μm containing a liquid crystalline medium with the following properties:

| | |
|---|---|
| SN | <−20° |
| N-I | +110° |
| Δn | 0.1350 | consisting of an achiral base mixture:

| | |
|---|---|
| PCH-2 | 6.0 |
| PCH-3 | 20.0 |
| PCH-4 | 7.0 |
| PCH-5 | 7.0 |
| ME2N.F | 2.0 |
| ME3N.F | 2.0 |
| CCH-34 | 15.0 |
| CPTP-301 | 3.0 |
| CPTP-302 | 3.0 |
| CPTP-303 | 4.0 |
| BCH-32 | 8.0 |
| CP-33F | 6.0 |
| CF-35F | 6.0 |
| CBC-33 | 3.0 |
| CBC-53 | 4.0 |
| CBC-55 | 4.0 | and being doped with 0.86% S-811 shows the following switching parameters:

| | |
|---|---|
| $T_{ave}$ | 310 ms |
| $V_{10}$ | 2.20 V |
| $V_{90}/V_{10}$ | 1.064 |

EXAMPLE 35

A STN display as described in Example 28 and a cell gap of 6.3 μm containing a liquid crystalline medium with the following properties:

| | |
|---|---|
| S-N | <-40° |
| N-I | +110° |
| Δn | 0.1354 | consisting of an achiral base mixture:

| | |
|---|---|
| PCH-2 | 6.0 |
| PCH-3 | 20.0 |
| PCH-5 | 6.0 |
| ME2N.F | 4.0 |
| ME3N.F | 3.0 |
| PCH-301 | 5.0 |
| CCH-34 | 6.0 |
| CPTP-301 | 6.0 |
| CPTP-302 | 6.0 |
| CPTP-303 | 6.0 |
| CP-33F | 7.0 |
| CP-35F | 7.0 |
| CCPC-33 | 4.0 |
| CCPC-35 | 4.0 | and being doped with 0.86% S-811 shows the following switching parameters:

| | |
|---|---|
| $T_{ave}$ | 320 ms |
| $V_{10}$ | 2.20 V |
| $V_{90}/V_{10}$ | 1.047 |

COMPARATIVE EXAMPLE 7

A STN display as described in Example 35 contains a medium with the following properties:

| | |
|---|---|
| S-N | -40° |
| N-I | +112° |
| Δn | 0.1354 | consisting of

| | |
|---|---|
| PCH-302 | 26.0 |
| ME2N.F | 3.0 |
| ME3N.F | 3.0 |
| ME5N.F | 7.0 |
| ME7N.F | 6.0 |
| ECCP-31 | 5.0 |
| ECCP-32 | 5.0 |
| ECCP-33 | 5.0 |
| ECCP-3 | 9.0 |
| ECCP-5 | 9.0 |
| ECCP-3F.F | 8.0 |
| CBC-33 | 3.0 |
| CBC-53 | 3.0 |
| CPTP-301 | 4.0 |
| CPTP-302 | 4.0 | and being doped with 0.86% of S-811 shows the following switching parameters:

| | |
|---|---|
| $T_{ave}$ | 364 ms |
| $V_{10}$ | 2.28 V |
| $V_{90}/V_{10}$ | 1.055 |

This comparison clearly shows that with the aid of bicyclohexanyles of formula I1 and/or phenyl bicyclohexylcarboxylates of formula I2 switching times can be considerably improved.

EXAMPLE 36

A STN display as described in Example 28 containing a liquid crystalline medium with the following properties:

| | |
|---|---|
| S-N | <-15° |
| N-I | 77° |
| Δn | 0.161 |
| PCH-2 | 16.0 |
| ME2N.F | 3.0 |
| PCH-301 | 7.0 |
| K6 | 5.0 |
| K9 | 5.0 |
| PYP-5F | 10.0 |
| CCH-34 | 15.0 |
| CCP-31 | 5.0 |
| PTP-201 | 4.0 |
| CPTP-301 | 6.0 |
| CPTP-302 | 6.0 |
| CPTP-303 | 6.0 |
| CPTP30CF3 | 6.0 |
| CPTP-50CF3 | 6.0 | consisting of an achiral base material and being doped with S-811 shows the following switching properties:

| | |
|---|---|
| $T_{ave}$ | 136 ms |
| $V_{10}$ | 1.74 V |
| $V_{90}/V_{10}$ | 1.076 |

COMPARATIVE EXAMPLE 8

A STN display as described in Example 28 containing a liquid crystalline medium with the following properties:

| | |
|---|---|
| S-N | <-30° |
| N-I | +80° |
| Δn | 0.1627 | consisting of an achiral base material

| | |
|---|---|
| PCH-3 | 24.00 |
| PCH-301 | 18.0 |
| PCH-302 | 4.0 |
| CCP-30CF3 | 3.0 |
| K6 | 5.0 |
| K9 | 5.0 |
| PYP-5F | 5.0 |
| CP-33F | 5.0 |
| PTP-201 | 2.0 |
| CPTP-301 | 6.0 |
| CPTP-302 | 5.0 |
| CPTP-30CF3 | 9.0 |
| CPTP-50CF3 | 9.0 | and being doped with S-811 shows the following properties:

| | |
|---|---|
| $T_{ave}$ | 145 ms |
| $V_{10}$ | 1.97 V |
| $V_{90}/V_{10}$ | 1.058 |

COMPARATIVE EXAMPLE 9

A STN display as described in Example 28 containing a liquid crystalline medium with

| S-N | <−30° |
|---|---|
| N-I | +80° |
| Δn | 0.1615 | consisting of an achiral base material

| PCH-3 | 24.0 |
|---|---|
| K6 | 6.0 |
| K9 | 6.0 |
| PCH301 | 18.0 |
| PCH-302 | 3.0 |
| CCH-34 | 10.0 |
| PTP-201 | 3.0 |
| CPTP-301 | 6.0 |
| CPTP-302 | 6.0 |
| CPTP-30CF3 | 9.0 |
| CPTP-50CF3 | 9.0 | and being doped with S-811 shows the following properties:

| $T_{ave}$ | 130 ms |
|---|---|
| $V_{10}$ | 2.03 V |
| $V_{90}/V_{10}$ | 1.060 |

EXAMPLE 37

A STN display as described in Example 28 having d=8 μm containing a liquid crystalline medium with

| S-N | <−30° C. |
|---|---|
| N-I | +85° C. |
| Δn | 0.1096 | consisting of an achiral base material

| PCH-3 | 22.0% |
|---|---|
| PCH-4 | 4.0% |
| PCH-301 | 7.0% |
| ME2N.F | 2.0% |
| ME3N.F | 3.0% |
| CCH-34 | 15.0% |
| PYP-31 | 8.0% |
| CCP-20CF3 | 5.0% |
| CCP-30CF3 | 6.0% |
| CCP-40CF3 | 3.0% |
| CP-33F | 6.0% |
| CP-35F | 5.0% |
| BCH-32 | 8.0% |
| CCPC-33 | 3.0% |
| CCPC-34 | 3.0% | and being doped with S-811 shows the following switching properties:

| $T_{ave}$ | 310 ms |
|---|---|
| $V_{10}$ | 2.06 V |
| $V_{90}/V_{10}$ | 1.095 |

EXAMPLE 38

A STN display as described in Example 1 containing a liquid crystalline medium with

| S-N | <−15° C. |
|---|---|
| N-I | 85.4° C. |
| Δn | 0.1425 | consisting of an achiral base material

| PCH-3 | 21% |
|---|---|
| PCH-5 | 15% |
| PCH-302 | 23% |
| K6 | 4% |
| BCH-32 | 7% |
| ECCP-31 | 5% |
| ECCP-32 | 5% |
| CPTP-301 | 5% |
| CPTP-302 | 5% |
| CPTP-303 | 4% |
| CCP-V-OT | 6% | and being doped with S-811 shows the following switching properties:

| $T_{ave}$: | 262 ms |
|---|---|
| $V_{10}$: | 2.36 V |
| $V_{90}/V_{10}$: | 1.038 |

EXAMPLE 39

A STN display as described in Example 1 containing a liquid crystalline medium with

| S-N | <−15° C. |
|---|---|
| N-I | 87.3° C. |
| Δn | 0.1435 | consisting of an achiral base material

| PCH-3 | 21% |
|---|---|
| PCH-5 | 15% |
| PCH-302 | 23% |
| K6 | 4% |
| BCH-32 | 7% |
| ECCP-31 | 5% |
| ECCP-32 | 5% |
| CPTP-301 | 5% |
| CPTP-302 | 5% |
| CPTP-303 | 4% |
| CCP-1V-OT | 6% | and being doped with S-811 shows the following switching properties:

| $T_{ave}$: | 287 ms |
|---|---|
| $V_{10}$: | 2.33 V |
| $V_{90}/V_{10}$: | 1.029 |

EXAMPLE 40

A STN display as described in Example 1 containing a liquid crystalline medium with

| S-N | <-15° C. |
|---|---|
| N-I | 86.5° C. |
| Δn | 0.1425 | consisting of an achiral base material

| PCH-3 | 21% |
|---|---|
| PCH-5 | 15% |
| PCH-302 | 23% |
| K6 | 4% |
| BCH-32 | 7% |
| ECCP-31 | 5% |
| ECCP-32 | 5% |
| CPTP-301 | 5% |
| CPTP-302 | 5% |
| CPTP-303 | 4% |
| CCP-1E3OCF3 | 6% | and being doped with S-811 shows the following switching properties:

| $T_{ave}$: | 280 ms |
|---|---|
| $V_{10}$: | 2.33 V |
| $V_{90}/V_{10}$: | 1.038 |

COMPARATIVE EXAMPLE 10

A STN display as described in Example 1 containing a liquid crystalline medium with

| S-N | <-15° C. |
|---|---|
| N-I | 85.4° C. |
| Δn | 0.1415 | consisting of an achiral base material

| PCH-3 | 21% |
|---|---|
| PCH-5 | 15% |
| PCH-302 | 23% |
| K6 | 4% |
| BCH-32 | 7% |
| ECCP-31 | 5% |
| ECCP-32 | 5% |
| CPTP-301 | 5% |
| CPTP-302 | 5% |
| CCP-2OCF3 | 4% |
| CCP-4OCF3 | 2% | and being doped with S-811 shows the following switching properties:

| $T_{ave}$: | 245 ms |
|---|---|
| $V_{10}$: | 2.35 V |
| $V_{90}/V_{10}$: | 1.043 |

This comparison shows that the replacement of CCP-nOCF3 by CCP-nV-OT or CCP-nE3OCF3 (Example 38–40) considerably improves the electro-optic steepness ($V_{90}/V_{10}$).

EXAMPLE 41

A STN display as described in Example 1 containing a liquid crystalline medium with

| S-N | <-15° C. |
|---|---|
| N-I | 89.1° C. |
| Δn | 0.1440 | consisting of an achiral base material

| PCH-3 | 21% |
|---|---|
| PCH-5 | 15% |
| PCH-302 | 21% |
| K6 | 4% |
| BCH-32 | 6% |
| ECCP-32 | 4% |
| CPTP-301 | 5% |
| CPTP-302 | 5% |
| CPTP-303 | 4% |
| CCP-1V-OT | 15% | and being doped with S-811 shows the following switching properties:

| $T_{ave}$: | 256 ms |
|---|---|
| $V_{10}$: | 2.26 V |
| $V_{90}/V_{10}$: | 1.039 |

EXAMPLE 42

A STN display as described in Example 1 containing a liquid crystalline medium with

| N-I | +78° C. |
|---|---|
| Δn | 0.1411 | consisting of an achiral base material

| PCH-3 | 23.00% |
|---|---|
| PCH-302 | 20.00% |
| PCH-304 | 6.00% |
| PTP-102 | 5.00% |
| CPTP-301 | 6.00% |
| CPTP-302 | 6.00% |
| CPTP-303 | 6.00% |
| B-10.FN | 7.00% |
| CCH-34 | 15.00% |
| CCP-3OCF3 | 7.00% | and being doped with S-811 shows the following switching properties:

| $T_{ave}$: | 188 ms |
|---|---|
| $V_{10}$: | 2.26 V |
| $V_{90}/V_{10}$: | 1.040 |

EXAMPLE 43

A STN display as described in Example 1 containing a liquid crystalline medium with

| N-I | 76° C. |
|---|---|
| Δn | 0.1451 | consisting of an achiral base material

| | |
|---|---|
| PCH-3 | 23.00% |
| PCH-302 | 20.00% |
| PCH-304 | 6.00% |
| CCH-303 | 12.00% |
| PTP-102 | 5.00% |
| CPTP-301 | 6.00% |
| CPTP-302 | 6.00% |
| CPTP-303 | 5.00% |
| B-10.FN | 7.00% |
| ECCP-31 | 4.00% |
| CCP-30CF3 | 6.00% | and being doped with S-811 shows the following switching properties:

| | |
|---|---|
| $T_{ave}$: | 209 ms |
| $V_{10}$: | 2.31 V |
| $V_{90}/V_{10}$: | 1.030 |

EXAMPLE 44

A STN display as described in Example 17 containing a liquid crystalline medium with

| | |
|---|---|
| N-I | 85° C. |
| Δn | 0.1726 | consisting of an achiral base material

| | |
|---|---|
| PCH-2 | 11.00% |
| ME2N | 4.50% |
| K6 | 8.00% |
| K9 | 8.00% |
| PYP-5F | 2.00% |
| PYP-32 | 2.00% |
| PCH-301 | 6.50% |
| PTP-102 | 4.50% |
| PTP-201 | 6.00% |
| ECCP-31 | 7.00% |
| ECCP-32 | 3.00% |
| ECCP-3F | 7.50% |
| CPTP-301 | 6.00% |
| CPTP-302 | 6.50% |
| CPTP-303 | 5.00% |
| CCH-35 | 12.50% | and being doped with S-811 shows the following switching properties:

| | |
|---|---|
| $T_{ave}$: | 116 ms |
| $V_{10}$: | 2.09 V |
| $V_{90}/V_{10}$: | 1.077 |

EXAMPLE 45

A STN display as described in Example 17 containing a liquid crystalline medium with

| | |
|---|---|
| N-I | 95° C. |
| Δn | 0.1705 | consisting of an achiral base material

| | |
|---|---|
| ME2N.F | 2.00% |
| ME3N.F | 3.00% |
| ME4N.F | 5.00% |
| PCH-3 | 21.00% |
| PCH-302 | 15.00% |
| PTP-102 | 6.00% |
| PTP-201 | 5.00% |
| PTP-20F | 2.00% |
| ECCP-3F | 3.00% |
| CPTP-301 | 5.00% |
| CPTP-302 | 6.00% |
| CPTP-303 | 5.00% |
| BCH-32 | 5.00% |
| CBC-33 | 3.00% |
| CBC-33F | 4.00% |
| CCH-35 | 10.00% | and being doped with S-811 shows the following switching properties:

| | |
|---|---|
| $T_{ave}$: | 123 ms |
| $V_{10}$: | 2.07 V |
| $V_{90}/V_{10}$: | 1.052 |

EXAMPLE 46

A STN display as described in Example 17 containing a liquid crystalline medium with

| | |
|---|---|
| N-I | 82° C. |
| Δn | 0.1745 | consisting of an achiral base material

| | |
|---|---|
| K6 | 6.00% |
| K9 | 6.00% |
| K12 | 6.00% |
| BCH-32 | 5.00% |
| CCH-34 | 10.00% |
| PCH-301 | 17.00% |
| PTP-20F | 6.00% |
| PTP-40F | 6.00% |
| CCP-20CF3 | 4.00% |
| CCP-30CF3 | 5.00% |
| CCP-40CF3 | 4.00% |
| CCP-50CF3 | 5.00% |
| PTP-102 | 4.00% |
| PTP-201 | 4.00% |
| CPTP-301 | 5.00% |
| CPTP-302 | 7.00% | and being doped with S-811 shows the following switching properties:

| | |
|---|---|
| $T_{ave}$: | 80 ms |
| $V_{10}$: | 2.47 V |
| $V_{90}/V_{10}$: | 1.101 |

EXAMPLE 47

A STN display as described in Example 17 containing a liquid crystalline medium with

| N-I | 81° C. |
|---|---|
| Δn | 0.1749 | consisting of an achiral base material

| K6 | 9.00% |
|---|---|
| K9 | 9.00% |
| K15 | 9.00% |
| BCH-32 | 8.00% |
| D-301 | 8.00% |
| CCH-34 | 9.00% |
| CCH-35 | 9.00% |
| PCH-301 | 8.00% |
| CCP-30CF3 | 5.00% |
| PTP-102 | 6.00% |
| PTP-201 | 6.00% |
| CPTP-301 | 4.00% |
| CPTP-302 | 4.00% |
| CPTP-30CF3 | 6.00% | and being doped with S-811 shows the following switching properties:

| $T_{ave}$: | 77 ms |
|---|---|
| $V_{10}$: | 2.22 V |
| $V_{90}/V_{10}$: | 1.121 |

EXAMPLE 48

A STN display as described in Example 17 containing a liquid crystalline medium with

| N-I | 78° C. |
|---|---|
| Δn | 0.1722 | consisting of an achiral base material

| K6 | 3.00% |
|---|---|
| K9 | 8.00% |
| CCH-34 | 10.00% |
| PCH-301 | 13.00% |
| PCH-302 | 15.00% |
| D-301 | 6.00% |
| PTP-20F | 7.00% |
| CPTP-30CF3 | 9.00% |
| CPTP-50CF3 | 9.00% |
| PTP-102 | 5.00% |
| PTP-201 | 5.00% |
| CPTP-301 | 5.00% |
| BCH-32 | 5.00% | and being doped with S-811 shows the following switching properties:

| $T_{ave}$: | 91 ms |
|---|---|
| $V_{10}$: | 2.84 V |
| $V_{90}/V_{10}$: | 1.063 |

EXAMPLE 49

A STN display as described in Example 17 containing a liquid crystalline medium with

| N-I | 84° C. |
|---|---|
| Δn | 0.1733 | consisting of an achiral base material

| K6 | 8.00% |
|---|---|
| K9 | 6.00% |
| PCH-3 | 10.00% |
| BCH-32 | 5.00% |
| CCH-34 | 10.00% |
| PCH-301 | 11.00% |
| PTP-20F | 6.00% |
| PTP-40F | 6.00% |
| CCP-20CF3 | 4.00% |
| CCP-30CF3 | 5.00% |
| CCP-40CF3 | 4.00% |
| CCP-50CF3 | 5.00% |
| PTP-102 | 4.00% |
| PTP-201 | 4.00% |
| CPTP-301 | 5.00% |
| CPTP-302 | 7.00% | and being doped with S-811 shows the following switching properties:

| $T_{ave}$: | 85 ms |
|---|---|
| $V_{10}$: | 2.21 V |
| $V_{90}/V_{10}$: | 1.095 |

EXAMPLE 50

A STN display as described in Example 1 containing a liquid crystalline medium with

| N-I | 101° C. |
|---|---|
| Δn | 0.1407 | consisting of an achiral base material

| PCH-3 | 15.00% |
|---|---|
| ME2N.F | 2.20% |
| ME3N.F | 3.30% |
| ME4N.F | 4.00% |
| PCH-302 | 7.50% |
| CCH-35 | 6.50% |
| ECCP-3 | 5.00% |
| ECCP-3F | 12.00% |
| ECCP-5F | 6.00% |
| BCH-32 | 3.00% |
| BCH-2F.F | 10.00% |
| BCH-3F.F | 9.00% |
| PTP-102 | 2.00% |
| PTP-201 | 2.50% |
| CPTP-301 | 5.00% |
| CBC-33F | 4.00% |
| CBC-53F | 3.00% | and being doped with S-811 shows the following switching properties:

| $T_{ave}$: | 224 ms |
|---|---|
| $V_{10}$: | 2.04 V |
| $V_{90}/V_{10}$: | 1.059 |

EXAMPLE 51

A STN display as described in Example 1 having a cell group of 5.6 µm containing a liquid crystalline medium with

| | |
|---|---|
| N-I | 109° C. |
| Δn | 0.1523 | consisting of an achiral base material

| | |
|---|---|
| ME2N.F | 2.00% |
| ME3N.F | 2.00% |
| PCH-3 | 20.00% |
| PCH-5 | 20.00% |
| PYP-5F | 4.00% |
| CP-3OCF3 | 10.00% |
| CP-5OCF3 | 10.00% |
| CCP-3OCF3 | 3.00% |
| PTP-102 | 2.00% |
| CCH-35 | 5.00% |
| CPTP-301 | 6.00% |
| CPTP-302 | 7.00% |
| CPTP-303 | 6.00% |
| CBC-33 | 2.00% |
| BCH-32 | 1.00% | and being doped with S-811 shows the following switching properties:

| | |
|---|---|
| $T_{ave}$: | 226 ms |
| $V_{10}$: | 2.07 V |
| $V_{90}/V_{10}$: | 1.063 |

EXAMPLE 52

A STN display as described in Example 51 containing a liquid crystalline medium with

| | |
|---|---|
| N-I | 111° C. |
| Δn | 0.1523 | consisting of an achiral base material

| | |
|---|---|
| ME2N.F | 3.00% |
| K6 | 5.00% |
| K9 | 5.00% |
| PCH-3 | 21.00% |
| PCH-4 | 10.00% |
| CP-3OCF3 | 10.00% |
| CP-5OCF3 | 7.00% |
| CCP-3OCF3 | 5.00% |
| PTP-102 | 2.00% |
| CP-33 | 6.00% |
| CCH-35 | 8.00% |
| CBC-33 | 4.00% |
| CPTP-301 | 5.00% |
| CPTP-302 | 6.00% |
| CPTP-303 | 3.00% | and being doped with S-811 shows the following switching properties:

| | |
|---|---|
| $T_{ave}$: | 201 ms |
| $V_{10}$: | 2.09 V |
| $V_{90}/V_{10}$: | 1.071 |

EXAMPLE 53

A STN display as described in Example 51 containing a liquid crystalline medium with

| | |
|---|---|
| S-N | <-30 C. |
| N-I | 101° C. |
| Δn | 0.1527 | consisting of an achiral base material

| | |
|---|---|
| ME2N.F | 3.00% |
| ME3N.F | 4.00% |
| PCH-3 | 20.00% |
| PCH-5 | 15.00% |
| PCH-302 | 5.00% |
| CP-3OCF3 | 9.00% |
| CP-5OCF3 | 9.00% |
| CCP-3OCF3 | 6.00% |
| PTP-102 | 3.00% |
| CCH-35 | 5.00% |
| CPTP-301 | 6.00% |
| CPTP-302 | 7.00% |
| CPTP-303 | 6.00% |
| CBC-33 | 2.00% | and being doped with S-811 shows the following switching properties:

| | |
|---|---|
| $T_{ave}$: | 221 ms |
| $V_{10}$: | 2.07 V |
| $V_{90}/V_{10}$: | 1.063 |

EXAMPLE 54

A STN display as described in Example 51 containing a liquid crystalline medium with

| | |
|---|---|
| N-I | 109° C. |
| Δn | 0.1520 | consisting of an achiral base material

| | |
|---|---|
| ME2N.F | 3.00% |
| ME3N.F | 4.00% |
| PCH-3 | 20.00% |
| PCH-5 | 15.00% |
| PCH-302 | 5.00% |
| CP-3OCF3 | 9.00% |
| CP-5OCF3 | 9.00% |
| CCP-3OCF3 | 6.00% |
| PTP-102 | 3.00% |
| CCH-34 | 5.00% |
| CPTP-301 | 6.00% |
| CPTP-302 | 7.00% |
| CPTP-303 | 6.00% |
| CBC-33 | 2.00% | and being doped with S-811 shows the following switching properties:

| | |
|---|---|
| $T_{ave}$: | 222 ms |
| $V_{10}$: | 2.03 V |
| $V_{90}/V_{10}$: | 1.059 |

EXAMPLE 55

A STN display as described in Example 51 containing a liquid crystalline medium with

| | |
|---|---|
| N-I | 110° C. |
| Δn | 0.1574 | consisting of an achiral base material

| | |
|---|---|
| ME2N.F | 3.00% |
| ME3N.F | 4.00% |
| PCH-3 | 18.00% |
| PCH-5 | 17.00% |
| PCH-302 | 3.00% |
| CP-30CF3 | 9.00% |
| CP-50CF3 | 9.00% |
| CCP-30CF3 | 6.00% |
| PTP-102 | 3.00% |
| CCH-34 | 5.00% |
| CPTP-301 | 6.00% |
| CPTP-302 | 6.00% |
| CPTP-303 | 6.00% |
| CBC-33 | 2.00% | and being doped with S-811 shows the following switching properties:

| | |
|---|---|
| $T_{ave}$: | 208 ms |
| $V_{10}$: | 1.99 V |
| $V_{90}/V_{10}$: | 1.060 |

EXAMPLE 56

A STN display as described in Example 51 containing a liquid crystalline medium with

| | |
|---|---|
| S-N | <-30° C. |
| N-I | 100° C. |
| Δn | 0.1497 | consisting of an achiral base material

| | |
|---|---|
| ME2N.F | 3.00% |
| ME3N.F | 4.00% |
| PCH-3 | 23.00% |
| PCH-5 | 12.00% |
| PCH-302 | 8.00% |
| CP-30CF3 | 8.00% |
| CP-50CF3 | 8.00% |
| ECCP-3 | 5.00% |
| PTP-102 | 4.00% |
| CCH-35 | 8.00% |
| CPTP-301 | 6.00% |
| CPTP-302 | 6.00% |
| CPTP-303 | 5.00% | and being doped with S-811 shows the following switching properties:

| | |
|---|---|
| $T_{ave}$: | 218 ms |
| $V_{10}$: | 2.07 V |
| $V_{90}/V_{10}$: | 1.048 |

EXAMPLE 57

A STN display as described in Example 51 containing a liquid crystalline medium with

| | |
|---|---|
| N-I | 110° C. |
| Δn | 0.1496 | consisting of an achiral base material

| | |
|---|---|
| ME2N.F | 3.00% |
| ME3N.F | 4.00% |
| PCH-3 | 17.00% |
| PCH-5 | 19.00% |
| PCH-302 | 4.00% |
| CP-30CF3 | 9.00% |
| CP-50CF3 | 9.00% |
| CCP-30CF3 | 6.00% |
| PTP-102 | 2.00% |
| CCH-35 | 5.00% |
| CPTP-301 | 6.00% |
| CPTP-302 | 6.00% |
| CPTP-303 | 6.00% |
| CBC-33 | 2.00% | and being doped with S-811 shows the following switching properties:

| | |
|---|---|
| $T_{ave}$: | 222 ms |
| $V_{10}$: | 2.06 V |
| $V_{90}/V_{10}$: | 1.063 |

EXAMPLE 58

A STN display as described in Example 1 having d=7.5 μm containing a liquid crystalline medium with

| | |
|---|---|
| N-I | 81° C. |
| Δn | 0.11129 | consisting of an achiral base material

| | |
|---|---|
| PCH-3 | 22.00% |
| PCH-302 | 22.00% |
| K6 | 6.00% |
| CCH-35 | 8.00% |
| BCH-32 | 6.00% |
| CCP-20CF3 | 5.00% |
| CCP-30CF3 | 7.00% |
| CCP-40CF3 | 5.00% |
| CCP-50CF3 | 7.00% |
| CP-30CF3 | 5.00% |
| CP-50CF3 | 4.00% |
| CPTP-302 | 3.00% | and being doped with S-811 shows the following switching properties:

| | |
|---|---|
| $T_{ave}$: | 226 ms |
| $V_{10}$: | 2.32 V |
| $V_{90}/V_{10}$: | 1.069 |

EXAMPLE 59

A STN display as described in Example 58 containing a liquid crystalline medium with

| N-I | 80° C. |
|---|---|
| Δn | 0.1120 | consisting of an achiral base material

| PCH-3 | 21.00% |
|---|---|
| PCH-302 | 22.00% |
| K6 | 7.00% |
| CCH-35 | 8.00% |
| BCH-32 | 4.00% |
| CCP-20CF3 | 6.00% |
| CCP-30CF3 | 7.00% |
| CCP-40CF3 | 6.00% |
| CCP-50CF3 | 7.00% |
| CP-30CF3 | 5.00% |
| CP-50CF3 | 4.00% |
| CPTP-302 | 3.00% | and being doped with S-811 shows the following switching properties:

| $T_{ave}$: | 230 ms |
|---|---|
| $V_{10}$: | 2.28 V |
| $V_{90}/V_{10}$: | 1.070 |

EXAMPLE 60

A STN display as described in Example 58 having d=5.2 μm containing a liquid crystalline medium with

| N-I | 86° C. |
|---|---|
| Δn | 0.1633 | consisting of an achiral base material

| PCH-3 | 30.00% |
|---|---|
| PCH-302 | 8.00% |
| CCH-35 | 10.00% |
| PCH-302 | 16.00% |
| PTP-102 | 5.00% |
| PTP-201 | 5.00% |
| CPTP-30CF3 | 5.00% |
| CPTP-50CF3 | 5.00% |
| CPTP-301 | 5.00% |
| CPTP-302 | 6.00% |
| CPTP-303 | 5.00% | and being doped with S-811 shows the following switching properties:

| $T_{ave}$: | 139 ms |
|---|---|
| $V_{10}$: | 2.29 V |
| $V_{90}/V_{10}$: | 1.052 |

EXAMPLE 61

A STN display as described in Example 60 containing a liquid crystalline medium with

| N-I | 85° C. |
|---|---|
| Δn | 0.1644 | consisting of an achiral base material

| PCH-3 | 28.00% |
|---|---|
| PCH-5 | 5.00% |
| K6 | 3.00% |
| CCH-35 | 10.00% |
| PCH-302 | 16.00% |
| PTP-102 | 6.00% |
| PTP-201 | 5.00% |
| CCP-20CF3 | 4.00% |
| CPTP-30CF3 | 4.00% |
| CPTP-50CF3 | 3.00% |
| CPTP-301 | 5.00% |
| CPTP-302 | 6.00% |
| CPTP-303 | 5.00% | and being doped with S-811 shows the following switching properties:

| $T_{ave}$: | 131 ms |
|---|---|
| $V_{10}$: | 2.28 V |
| $V_{90}/V_{10}$: | 1.057 |

EXAMPLE 62

A STN display as described in Example 1 containing a liquid crystalline medium with

| N-I | 85° C. |
|---|---|
| Δn | 0.1452 | consisting of an achiral base material

| PCH-3 | 26.00% |
|---|---|
| PCH-4 | 16.00% |
| PCH-5 | 4.00% |
| PCH-302 | 8.00% |
| BCH-32 | 5.00% |
| CCP-30CF3 | 4.00% |
| CCP-50CF3 | 3.00% |
| ECCP-2 | 4.00% |
| ECCP-3 | 3.00% |
| ECCP-2F.F | 7.00% |
| PTP-20F | 6.00% |
| CPTP-301 | 6.00% |
| CPTP-302 | 6.00% |
| CCH-35 | 2.00% | and being doped with S-811 shows the following switching properties:

| $T_{ave}$: | 277 ms |
|---|---|
| $V_{10}$: | 2.05 V |
| $V_{90}/V_{10}$: | 1.044 |

EXAMPLE 63

A STN display as described in Example 1 containing a liquid crystalline medium with

| N-I | 95° C. |
|---|---|
| Δn | 0.1447 | consisting of an achiral base material

| | |
|---|---|
| PCH-3 | 19.00% |
| PCH-5 | 4.00% |
| PCH-302 | 18.00% |
| K6 | 5.00% |
| CCH-34 | 7.00% |
| BCH-32 | 6.00% |
| CCP-30CF3 | 5.00% |
| CCP-50CF3 | 4.00% |
| PTP-20F | 3.00% |
| ECCP-2 | 8.00% |
| ECCP-2F.F | 6.00% |
| CPTP-301 | 5.00% |
| CPTP-302 | 6.00% |
| CPTP-303 | 4.00% | and being doped with S-811 shows the following switching properties:

| | |
|---|---|
| $T_{ave}$: | 192 ms |
| $V_{10}$: | 2.39 V |
| $V_{90}/V_{10}$: | 1.054 |

EXAMPLE 64

A STN display as described in Example 51 containing a liquid crystalline medium with

| | |
|---|---|
| N-I | 95° C. |
| Δn | 0.1548 | consisting of an achiral base material

| | |
|---|---|
| PCH-3 | 20.00% |
| PCH-302 | 16.00% |
| K6 | 7.00% |
| CCH-34 | 8.00% |
| BCH-32 | 6.00% |
| CCP-30CF3 | 5.00% |
| ECCP-32 | 2.00% |
| PTP-20F | 6.00% |
| ECCP-2 | 7.00% |
| ECCP-2F.F | 6.00% |
| CPTP-301 | 6.00% |
| CPTP-302 | 6.00% |
| CPTP-303 | 5.00% | and being doped with S-811 shows the following switching properties:

| | |
|---|---|
| $T_{ave}$: | 163 ms |
| $V_{10}$: | 2.39 V |
| $V_{90}/V_{10}$: | 1.054 |

EXAMPLE 65

A STN display as described in Example 1 with a cell gap of 6.56 μm containing a liquid crystalline medium with

| | |
|---|---|
| N-I | +80° C. |
| Δn | 0.1295 | consisting of an achiral base material

| | |
|---|---|
| PCH-2 | 18.0% |
| PCH-3 | 26.0% |
| ME-2N.F | 2.0% |
| CCH-34 | 5.0% |
| PTP-102 | 5.0% |
| PTP-201 | 6.0% |
| BCH-32 | 5.0% |
| CP-33F | 5.0% |
| CCP-35F | 5.00% |
| CCP-55F | 4.0% |
| CBC-33 | 4.0% |
| CBC-53 | 4.0% | and being doped with S-811 shows the following switching properties:

| | |
|---|---|
| $T_{ave}$: | 252 ms |
| $V_{10}$: | 1.92 V |
| $V_{90}/V_{10}$: | 1.067 |

EXAMPLE 66

A STN display as described in Example 17 containing a liquid crystalline medium with

| | |
|---|---|
| N-I | +94° C. |
| Δn | 0.1897 | consisting of an achiral base material

| | |
|---|---|
| K6 | 8.0% |
| K9 | 8.0% |
| K15 | 8.0% |
| BCH-32 | 14.0% |
| PCH-301 | 19.0% |
| CCH-35 | 8.0% |
| CCP-30CF3 | 5.0% |
| CPTP-30CF3 | 7.0% |
| PTP-102 | 5.0% |
| PTP-201 | 5.0% |
| CPTP-301 | 4.0% |
| CPTP-302 | 5.0% |
| CPTP-303 | 4.0% | and being doped with S-811 shows the following switching properties:

| | |
|---|---|
| $T_{ave}$: | 73 ms |
| $V_{10}$: | 2.47 V |
| $V_{90}/V_{10}$: | 1.113 |

EXAMPLE 67

In A STN display disclosed as Example 1 of EP 0 366 985 having the following parameters:

| | |
|---|---|
| twist angle | 180° |
| tilt angle | 1° |
| d · Δn | 0.5 | the liquid crystalline medium has been replaced by a medium in which 9.8% of trans, trans-4-methoxy-4'-propylcyclohexyl-cyclohexan (CCH-301) has been replaced by trans, trans-4-methyl-4'-propylcyclohexylcyclohexan (CCH-31). The properties of the resulting displays are compared in Table 1.

TABLE 1

|  | Mixture | |
| --- | --- | --- |
|  | EP 0 366 985 | Inventive |
| S-N | −15° | −15° |
| K-I | +87° | +87° |
| $V_{10}$ | 2.20 V | 2.20 V |
| $V_{90}/V_{10}$ | 1.158 | 1.159 |
| $t_{ave}$ | 82 ms | 75 ms |

This clearly shows that replacing only about 10% of CCH-301 by about 10% of CCH-31 yields an improvement of the switching time by about 10% without impairing other important properties.

We claim:

1. Supertwist liquid-crystal display containing two plane-parallel outer plates which, together with a frame, form a cell, a nematic liquid-crystal mixture of positive dielectric anisotropy which is present in the cell, electrode layers with superposed alignment layers on the insides of the outer plates, a pitch angle between the longitudinal axis of the molecules at the surface of the outer plates and the outer plates of from about 1 degree to 30 degrees, and a twist angle of the liquid-crystal mixture in the cell from alignment layer to alignment layer with a value of between 100° and 600°, wherein the nematic liquid-crystal mixture a) comprises 30–90% by weight of a liquid-crystalline component A, comprising one or more compounds having a dielectric anisotropy of more than +1.5;

b) comprises 10–65% by weight of a liquid-crystalline component B, comprising one or more components having a dielectric anisotropy from −1.5 to +1.5;

c) comprises 0–20% by weight of a liquid-crystalline component C, comprising one or more compounds having a dielectric anisotropy of below −1.5, and d) comprises an optically active component D in such an amount that the ratio between the layer thickness (separation of the plane-parallel outer plates) and the natural pitch of the chiral nematic liquid-crystal mixture is from about 0.2 to 1.3 and the nematic liquid-crystal mixture has a nematic phase range of at least 60° C., a viscosity of not more than 35 mPa.s and a dielectric anisotropy of at least +1, the dielectric anisotropies of the compounds and the parameters based on the nematic liquid-crystal mixture being based on a temperature of 20° C., characterized in that component B comprises at least one compound of formulae I1 and/or I2:

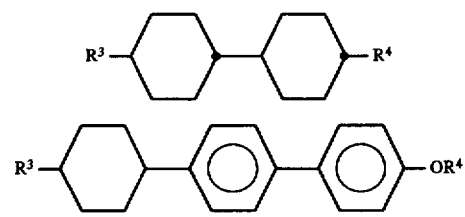

wherein $R^3$ and $R^4$ are each independently alkyl with 1 to 8 C atoms, and component A contains compounds of the formulae II and III,

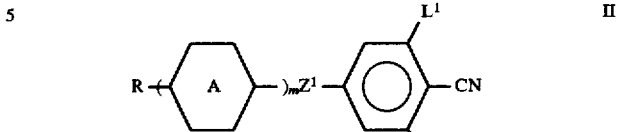

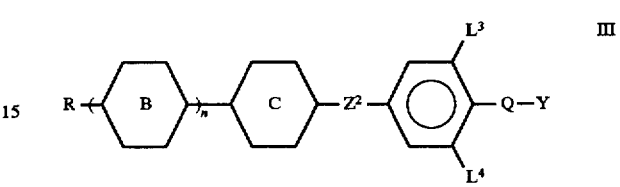

wherein

R is alkyl, alkoxy, oxaalkyl, alkenyl or alkenyloxy with up to 12 C atoms,

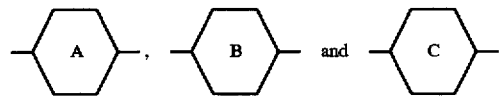

are each independently

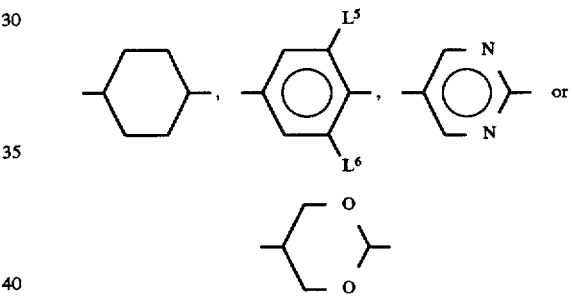

$L^1$ through $L^6$ are each independently H or F, $Z^2$ is -COO-, -CH$_2$CH$_2$- or a single bond, $Z^2$ is -COO-, -CH$_2$CH$_2$-, -C≡C- or a single bond, Q is CF$_2$, OCF$_2$, CFH, OCFH or a single bond, Y is F or Cl, m is 1 or 2, and n is 0 or 1.

2. Supertwist liquid-crystal display containing two plane-paid outer plates which, together with a frame, form a cell, a nematic liquid-crystal mixture of positive dielectric anisotropy which is present in the cell, electrode layers with superposed alignment layers on the insides of the outer plates, a pitch angle between the longitudinal axis of the molecules at the surface of the outer plate and the outer plates of from about 1 degree to 30 degrees, and a twist angle of the liquid-crystal mixture in the cell from alignment layer to alignment layer with a value of between 100° and 600°, wherein the nematic liquid-crystal mixture a) comprises 30–90% by weight of a liquid-crystalline component A, comprising one or more compounds having a dielectric anisotropy of more than +1.5;

b) comprises 10–65% by weight of a liquid-crystalline component B, comprising one or more components having a dielectric anisotropy from −1.5 to +1.5;

c) comprises 0–20% by weight of a liquid-crystalline component C, comprising one or more compounds having a dielectric anisotropy of below −1.5, and d) comprises an optically active component D in such an amount that the ratio between the layer thickness (separation of the plane-parallel outer plates) and the natural pitch of the chiral nematic liquid-crystal mixture is from 0.2 to 1.3 and the nematic liquid-crystal mixture has a nematic phase range of at least 60° C., a viscosity of not more than 35 mPa.s and a dielectric anisotropy of at least +1, the dielectric anisotropies of the compounds and the parameters based on the nematic liquid-crystal mixture being based on a temperature of 20°, and wherein component B comprises at least one compound of the formulae I1 or I2:

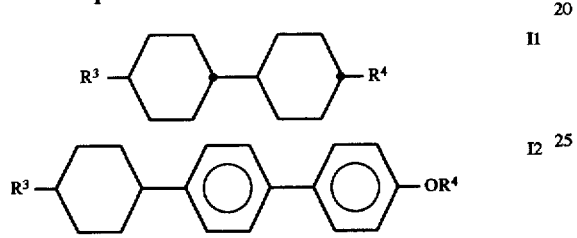

wherein $R^3$ and $R^4$ are each independently alkyl with 1 to 8 C atoms, and component A contains compounds of the formula II* and III,

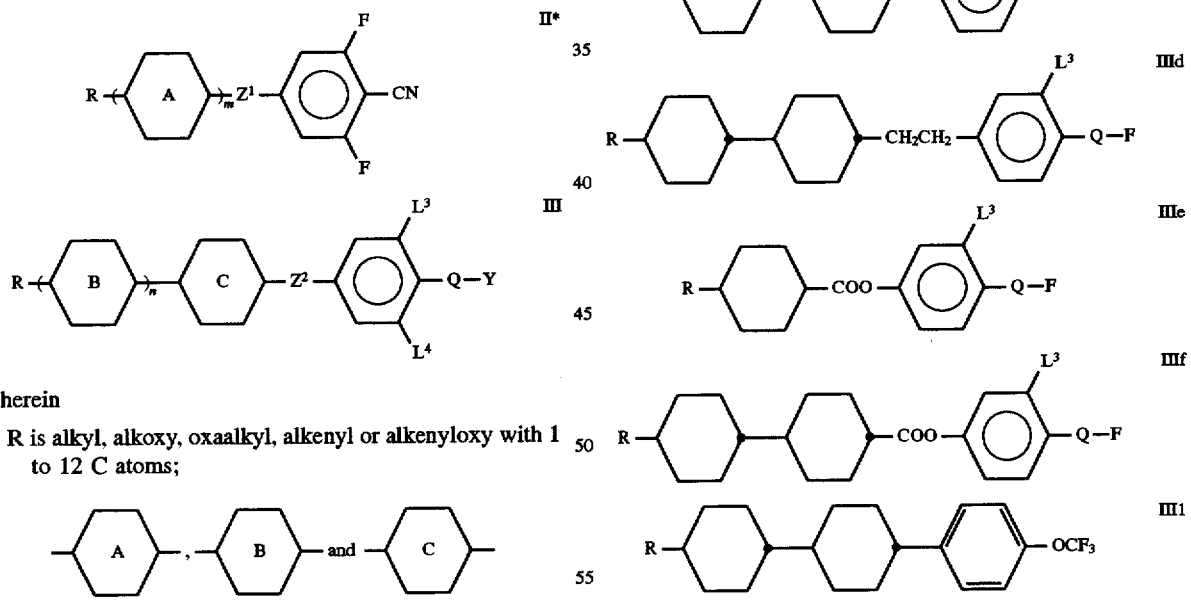

wherein

R is alkyl, alkoxy, oxaalkyl, alkenyl or alkenyloxy with 1 to 12 C atoms;

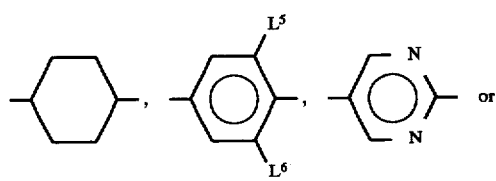

are each independently

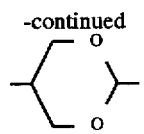

$L^3$ through $L^6$ are each independently H or F,
$Z^1$ is -CH$_2$CH$_2$- or a single bond,
$Z^2$ is -COO-, -CH$_2$CH$_2$-, -C≡C- or a single bond,
Q is CF$_2$, OCF$_2$, CFH, OCFH or a single bond,
Y is F or Cl,
m is 1 or 2, and
n is 0 or 1.

3. Display according to claim 2, wherein component A contains at least one compound selected from the formulae IIIa to IIIf and III1:

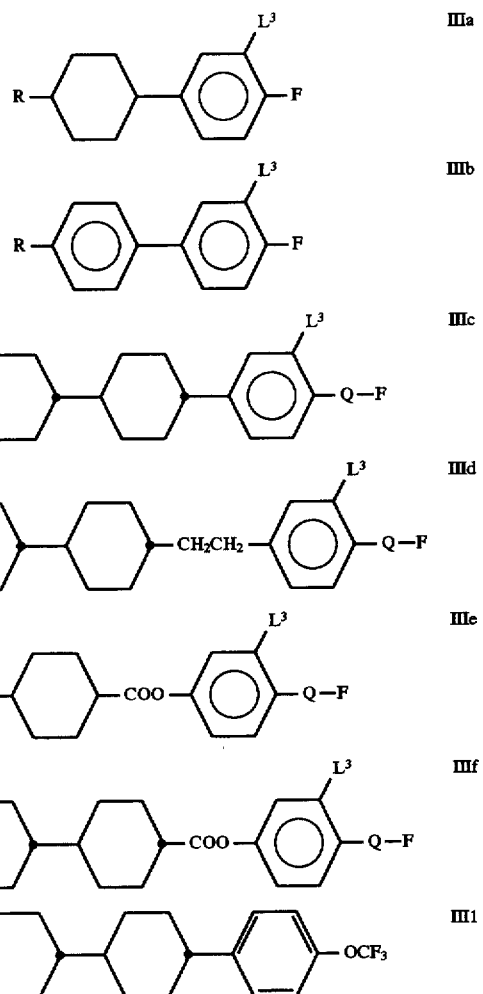

wherein R, $L^3$ and Q have the meaning given, and $R^2$ is oxaalkyl or alkenyl with 1 to 8 C atoms.

4. Display according to claim 1, wherein component B contains one or more compounds of formula I1a:

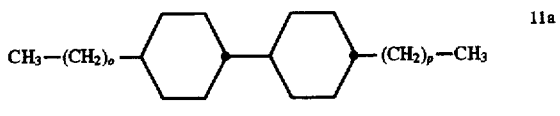

wherein o and p each are integers between 0 and 7 and the sum of o+p is an integer between 1 and 7.

5. Display according to claim 1, wherein component B contains one or more compounds of formula I2a:

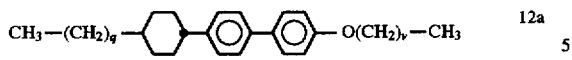

in which q and v are each an integer between 0 and 7 and the sum of q+v is an integer between 0 and 7.

6. Display according to claim 2, wherein component B contains one or more compounds of formula I2a:

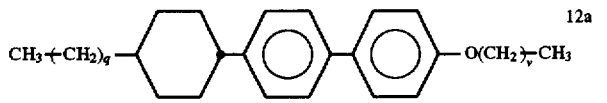

in which q and v are each an integer between 0 and 7 and the sum of q+v is an integer between 0 and 7.

7. Display according to claim 1, wherein component A contains one or more compounds of the formula T1b

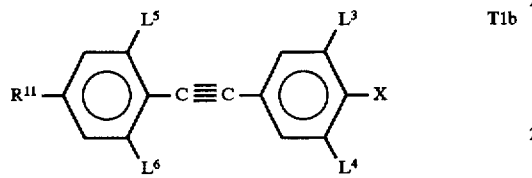

in which $R^{11}$ is $-C_nH_{2n+1}$, $-OC_nH_{2n+1}$,

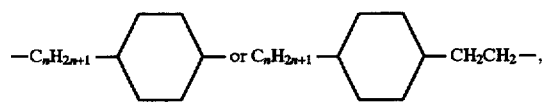

n is an integer from 1 to 15, $L^3$ through $L^6$ are each, independently of one another, H or F, and X is F, Cl or $OCF_3$.

8. Display according to claim 7, wherein the nematic mixture contains

5–25% of one or more compounds of formula I1,

20–35% of two or more compounds selected from the formulae X, XI, XII and T1b, and 10–30% of two or more compounds of formula IIa;

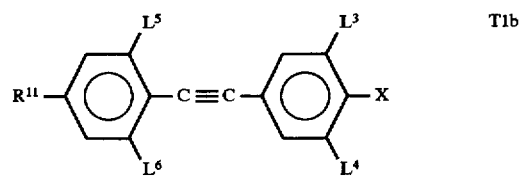

in which $R^{11}$ is $-C_nH_{2n+1}$, $-OC_nH_{2n+1}$,

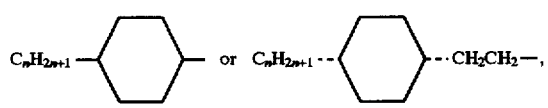

n is an integer from 1 to 15, $L^3$ through $L^6$ are each, independently of one another, H or F, and X is F, Cl or $OCF_3$.

9. A display according to claim 2, wherein component A additionally comprises at least one compound selected from the formulae IIa to IId and III1:

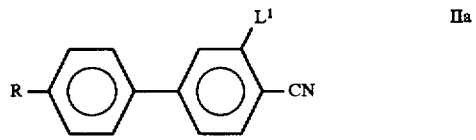

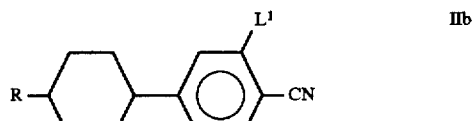

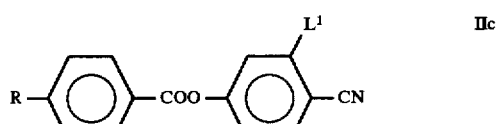

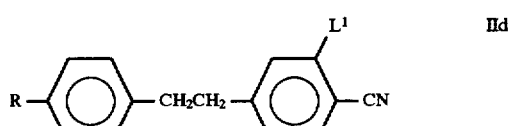

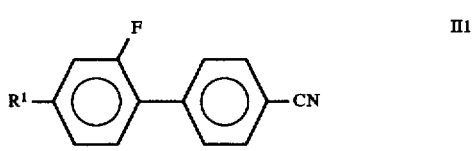

wherein

R is alkyl, alkoxy, oxaalkyl, alkenyl or alkenyloxy with 1 to 12 C atoms, $R^1$ is alkyl or alkoxy with 1 to 8 C atoms, and $L^1$ is H or F.

10. The display according to claim 5, wherein q and v are each an integer of 0 to 3 and the sum of q+v is an integer between 0 and 3.

11. A display according to claim 2, wherein the nematic liquid-crystal mixture comprises compounds of the formula I1, I2, II* and III1:

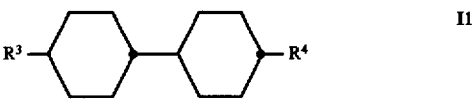

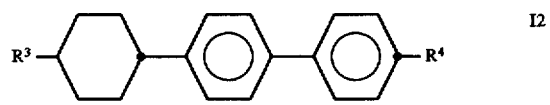

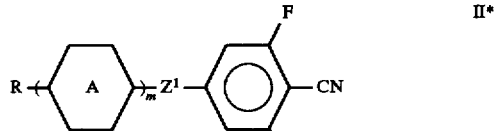

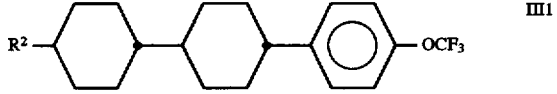

wherein $R^2$ is oxaalkyl or alkenyl with 1 to 8 C atoms, and $R^3$ and $R^4$ are each independently alkoxy of 1 to 8 C atoms.

12. 2'-Fluoro-4-cyanobiphenyl of formula IIIa

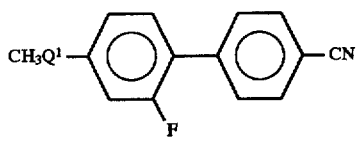

wherein $Q^1$ is O, $CH_2$ or a single bond.

13. A nematic liquid-crystal mixture comprising:

a) 30–90% by weight of a liquid-crystalline component A, comprising one or more compounds having a dielectric anisotropy of more than +1.5;

b) 10–65% by weight of a liquid-crystalline component B, comprising one or more components having a dielectric anisotropy from −1.5 to +1.5;

c) 0–20% by weight of a liquid-crystalline component C, comprising one or more compounds having a dielectric anisotropy of below −1.5, and d) an optically active component D wherein the nematic liquid-crystal mixture has a nematic phase range of at least 60° C., a viscosity of not more than 35 mPa.s and a dielectric anisotropy of at least +1, the dielectric anisotropies of the compounds and the parameters based on the nematic liquid-crystal mixture being based on a temperature of 20° C., and wherein component B comprises at least one compound of the formulae I1 or I2:

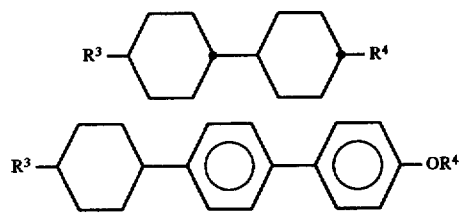

wherein $R^3$ and $R^4$ are each independently alkyl with 1 to 8 C atoms, and component A contains compounds of the formula II* and III,

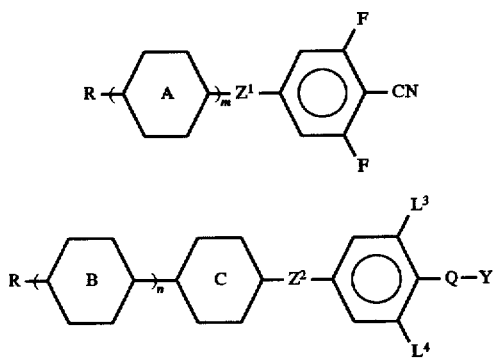

wherein

R is alkyl, alkoxy, oxaalkyl, alkenyl or alkenyloxy with 1 to 12 c atoms,

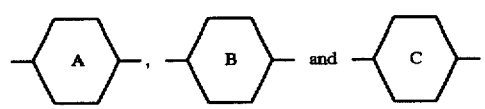

are each independently

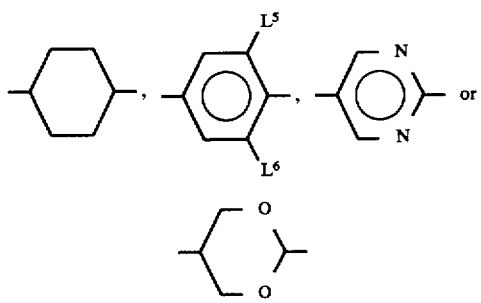

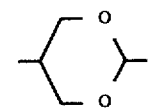

$L^3$ through $L^6$ are each independently H or F, $Z^1$ is $-CH_2CH_2-$ or a single bond, $Z^2$ is $-COO-$, $-CH_2CH_2-$, $-C\equiv C-$ or a single bond Q is $CF_2$, $OCF_2$, CFH, OCFH or a single bond, Y is F or Cl, m is 1 or 2, and n is 0 or 1.

14. A method for improving the switching times, electro-optic steepness or both of an STN-display containing a liquid crystal mixture which comprises incorporating in the liquid crystal mixture compounds of the formulae I1, I2, II* and III1:

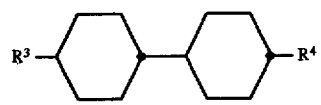

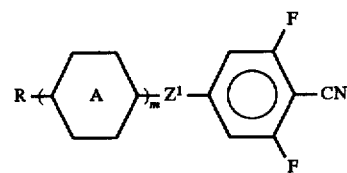

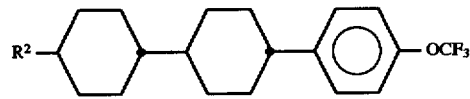

wherein $R^3$ and $R^4$ are each independently alkyl of 1 to 8 C atoms, R is alkyl, alkoxy, oxaalkyl, alkenyl or alkenyloxy of 1 to 12 C atoms,

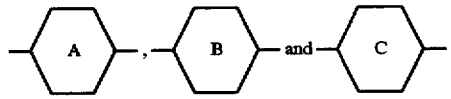

are each independently

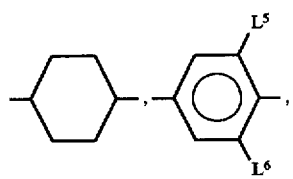

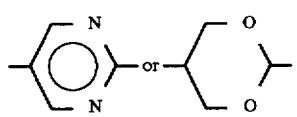
$Z^1$ is -CH$_2$CH$_2$- or a single bond, and R$^2$ is oxaalkyl or alkenyl with 1 to 8 C atoms.
15. A method for improving the switching times, electro-optic steepness or both of an STN-display containing a liquid crystal mixture which comprises incorporating in the liquid crystal mixture a compound of the formula IIIa:
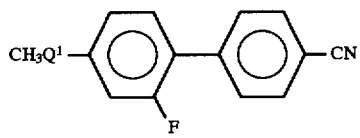
wherein
Q$^1$ is O, CH$_2$ or a single bond.
* * * * *